United States Patent
Chandran et al.

(10) Patent No.: US 9,977,815 B2
(45) Date of Patent: May 22, 2018

(54) GENERATING SECURED RECOMMENDATIONS FOR BUSINESS INTELLIGENCE ENTERPRISE SYSTEMS

(71) Applicants: Lakshmy Chandran, Bangalore (IN); Praveen S, Davangere (IN); Parsewar Kunal, Bidar (IN); Sneha Ranganath, Bangalore (IN)

(72) Inventors: Lakshmy Chandran, Bangalore (IN); Praveen S, Davangere (IN); Parsewar Kunal, Bidar (IN); Sneha Ranganath, Bangalore (IN)

(73) Assignee: SAP SE, Walldorf (DE)

( * ) Notice: Subject to any disclaimer, the term of this patent is extended or adjusted under 35 U.S.C. 154(b) by 360 days.

(21) Appl. No.: 14/579,786

(22) Filed: Dec. 22, 2014

(65) Prior Publication Data
US 2016/0179863 A1    Jun. 23, 2016

(51) Int. Cl.
*G06F 17/30* (2006.01)
*G06Q 10/00* (2012.01)

(52) U.S. Cl.
CPC ....... *G06F 17/30386* (2013.01); *G06Q 10/00* (2013.01)

(58) Field of Classification Search
USPC ........................................................ 707/751
See application file for complete search history.

(56) References Cited

U.S. PATENT DOCUMENTS

| | | | | |
|---|---|---|---|---|
| 8,307,110 B1* | 11/2012 | Katzer | ................ | H04L 12/1859 709/219 |
| 8,542,593 B1* | 9/2013 | Kumar | ................ | H04L 1/0078 370/235 |
| 9,330,134 B2* | 5/2016 | Long | ................ | G06F 17/30386 |
| 9,449,007 B1* | 9/2016 | Wood | ................ | G06F 17/3012 |
| 2002/0099602 A1* | 7/2002 | Moskowitz | ....... | G06F 17/30899 705/14.56 |
| 2002/0194204 A1* | 12/2002 | Mosher, Jr. | ......... | G06F 11/1471 |
| 2003/0014399 A1* | 1/2003 | Hansen | ............ | G06F 17/30864 |
| 2005/0080782 A1* | 4/2005 | Ratnaparkhi | ..... | G06F 17/30654 |
| 2007/0143238 A1* | 6/2007 | Kochunni | .............. | G06Q 10/06 706/45 |
| 2007/0166674 A1* | 7/2007 | Kochunni | ................ | G09B 7/02 434/236 |
| 2010/0063854 A1* | 3/2010 | Purvis | .................... | G06Q 10/02 705/5 |
| 2010/0070565 A1* | 3/2010 | Leblanc | .............. | G06F 17/3089 709/203 |
| 2010/0159967 A1* | 6/2010 | Pounds | ................... | H04L 51/14 455/466 |

(Continued)

*Primary Examiner* — Cam-Linh Nguyen
(74) *Attorney, Agent, or Firm* — Fountainhead Law Group P.C.

(57) ABSTRACT

In one embodiment a computer-implemented method for recommending documents to a user, the method comprises determining, by a computer, audit logs entries that are associated with members of a group that includes the user as a member, each audit log entry is associated with a file that a member of the group has accessed; analyzing, by the computer, the associated audit log entries; and generating, by the computer, a recommendation of at least one file for the user based on the analyzing of the associated audit log entries.

20 Claims, 30 Drawing Sheets

512

| ID | DOCUMENT CUID | DOCUMENT NAME | GROUP CUID | MODIFIED TIME | EVENT TYPE | RANK |
|---|---|---|---|---|---|---|
| 1 | D_ID_1 | Sales analysis | G_ID_1 | 28-09-2014 12:38:10.37 | 0 | 1 |
| 2 | D_ID_1 | Sales analysis | G_ID_2 | 28-09-2014 12:38:10.37 | 0 | 1 |
| 3 | D_ID_1 | Sales analysis | G_ID_3 | 28-09-2014 12:38:10.37 | 0 | 1 |

(56) References Cited

U.S. PATENT DOCUMENTS

| | | | |
|---|---|---|---|
| 2010/0250336 A1* | 9/2010 | Selinger | G06Q 30/02 705/26.7 |
| 2011/0087679 A1* | 4/2011 | Rosato | G06F 17/30867 707/749 |
| 2011/0173095 A1* | 7/2011 | Kassaei | G06Q 30/02 705/26.41 |
| 2011/0230229 A1* | 9/2011 | Das | G06Q 30/02 455/550.1 |
| 2012/0005227 A1* | 1/2012 | Nagano | G06F 17/30702 707/769 |
| 2012/0010996 A1* | 1/2012 | Horvitz | G06Q 30/02 705/14.53 |
| 2012/0084282 A1* | 4/2012 | Chiang | G06F 17/30864 707/725 |
| 2012/0246718 A1* | 9/2012 | Spears | G06Q 30/02 726/21 |
| 2012/0271805 A1* | 10/2012 | Holenstein | G06F 17/30876 707/706 |
| 2013/0054631 A1* | 2/2013 | Govani | G06F 17/30867 707/767 |
| 2013/0073935 A1* | 3/2013 | Bertot | G06Q 30/0631 715/205 |
| 2013/0185198 A1* | 7/2013 | Lorch | G06Q 20/29 705/39 |
| 2013/0290944 A1* | 10/2013 | Menon | G06F 9/4446 717/168 |
| 2014/0006399 A1* | 1/2014 | Vasudevan | G06F 17/30867 707/737 |
| 2014/0280105 A1* | 9/2014 | Resende | G06F 17/30551 707/725 |
| 2014/0350349 A1* | 11/2014 | Geurts | A61B 5/0022 600/300 |
| 2015/0046436 A1* | 2/2015 | Li | G06F 17/3053 707/723 |
| 2015/0046442 A1* | 2/2015 | Bannur | G06F 17/30867 707/731 |
| 2015/0242868 A1* | 8/2015 | Perelmutov | G06Q 30/0205 705/7.34 |
| 2015/0256475 A1* | 9/2015 | Suman | G06F 9/5027 709/226 |
| 2015/0370616 A1* | 12/2015 | Peterson | G06Q 30/0282 719/320 |
| 2015/0379574 A1* | 12/2015 | Pattan | G06Q 30/0261 705/14.58 |

* cited by examiner

512

| RECOMMENDATION HEADER |
|---|
| ID |
| Document CUID |
| Modified Time indicator |
| Event type |
| Rank |

| RECOMMENDATION DETAIL |
|---|
| ID |
| Sequence number |
| User CUID |
| Is Owner indicator |
| Count indicator |

| ID | DOCUMENT CUID | DOCUMENT NAME | GROUP CUID | MODIFIED TIME | EVENT TYPE | RANK |
|---|---|---|---|---|---|---|
| 1 | D_ID_1 | Sales analysis | G_ID_1 | 28-09-2014 12:38:10.37 | 0 | 1 |
| 2 | D_ID_1 | Sales analysis | G_ID_2 | 28-09-2014 12:38:10.37 | 0 | 1 |
| 3 | D_ID_1 | Sales analysis | G_ID_3 | 28-09-2014 12:38:10.37 | 0 | 1 |

| ID | SEQUENCE | USER CUID | IS OWNER | COUNT |
|---|---|---|---|---|
| 1 | 1 | U_ID_1 | True | 0 |

| ID | DOCUMENT CUID | DOCUMENT NAME | GROUP CUID | MODIFIED TIME | EVENT TYPE | RANK |
|---|---|---|---|---|---|---|
| 1 | D_ID_1 | Sales analysis | G_ID_1 | 28-09-2014 13:13:40.10 | 0 | 1 |
| 2 | D_ID_1 | Sales analysis | G_ID_2 | 28-09-2014 12:38:10.37 | 0 | 1 |
| 3 | D_ID_1 | Sales analysis | G_ID_3 | 28-09-2014 12:38:10.37 | 0 | 1 |

| ID | SEQUENCE | USER CUID | IS OWNER | COUNT |
|---|---|---|---|---|
| 1 | 1 | U_ID_1 | True | 1 |

| ID | DOCUMENT CUID | DOCUMENT NAME | GROUP CUID | MODIFIED TIME | EVENT TYPE | RANK |
|---|---|---|---|---|---|---|
| 1 | D_ID_1 | Sales analysis | G_ID_1 | 28-09-2014 12:38:10.37 | 0 | 0 |
| 2 | D_ID_1 | Sales analysis | G_ID_2 | 28-09-2014 13:10:40.16 | 0 | 0 |
| 3 | D_ID_1 | Sales analysis | G_ID_3 | 28-09-2014 12:38:10.37 | 0 | 0 |

| ID | SEQUENCE | USER CUID | IS OWNER | COUNT |
|---|---|---|---|---|
| 1 | 1 | U_ID_1 | True | 0 |
| 2 | 1 | U_ID_2 | False | 1 |

| ID | DOCUMENT CUID | DOCUMENT NAME | GROUP CUID | MODIFIED TIME | EVENT TYPE | RANK |
|---|---|---|---|---|---|---|
| 1 | D_ID_1 | Sales analysis | G_ID_1 | 28-09-2014 12:38:10.37 | 0 | 0 |
| 2 | D_ID_1 | Sales analysis | G_ID_2 | 28-09-2014 14:08:10.23 | 0 | 0 |
| 3 | D_ID_1 | Sales analysis | G_ID_3 | 28-09-2014 12:38:10.37 | 0 | 0 |

| ID | SEQUENCE | USER CUID | IS OWNER | COUNT |
|---|---|---|---|---|
| 1 | 1 | U_ID_1 | True | 0 |
| 2 | 1 | U_ID_2 | False | 2 |

| ID | DOCUMENT CUID | DOCUMENT NAME | GROUP CUID | MODIFIED TIME | EVENT TYPE | RANK |
|---|---|---|---|---|---|---|
| 1 | D_ID_1 | Sales analysis | G_ID_1 | 28-09-2014 12:38:10.37 | 0 | 0 |
| 2 | D_ID_1 | Sales analysis | G_ID_2 | 28-09-2014 13:10:40.16 | 0 | 0 |
| 3 | D_ID_1 | Sales analysis | G_ID_3 | 28-09-2014 16:00:10.15 | 0 | 0 |

| ID | SEQUENCE | USER CUID | IS OWNER | COUNT |
|---|---|---|---|---|
| 1 | 1 | U_ID_1 | True | 0 |
| 2 | 1 | U_ID_2 | False | 2 |
| 3 | 1 | U_ID_2 | False | 1 |

| ID | DOCUMENT CUID | DOCUMENT NAME | GROUP CUID | MODIFIED TIME | EVENT TYPE | RANK |
|----|---------------|---------------|------------|---------------|------------|------|
| 1 | D_ID_1 | Sales analysis | G_ID_1 | 28-09-2014 12:38:10.37 | 0 | 0 |
| 2 | D_ID_1 | Sales analysis | G_ID_2 | 28-09-2014 13:10:40.16 | 0 | 0 |
| 3 | D_ID_1 | Sales analysis | G_ID_3 | 28-09-2014 16:35:10.15 | 0 | 0 |

| ID | SEQUENCE | USER CUID | IS OWNER | COUNT |
|----|----------|-----------|----------|-------|
| 1 | 1 | U_ID_1 | True | 0 |
| 2 | 1 | U_ID_2 | False | 2 |
| 3 | 1 | U_ID_3 | False | 1 |
| 3 | 2 | U_ID_4 | False | 1 |

| ID | DOCUMENT CUID | DOCUMENT NAME | GROUP CUID | MODIFIED TIME | EVENT TYPE | RANK |
|---|---|---|---|---|---|---|
| 1 | D_ID_1 | Sales analysis | G_ID_1 | 28-09-2014 12:38:10.37 | 1 | 1 |

| ID | SEQUENCE | USER CUID | IS OWNER | COUNT |
|---|---|---|---|---|
| 1 | 1 | U_ID_1 | True | 0 |

| ID | DOCUMENT CUID | DOCUMENT NAME | GROUP CUID | MODIFIED TIME | EVENT TYPE | RANK |
|---|---|---|---|---|---|---|
| 1 | D_ID_1 | Sales analysis | G_ID_1 | 28-09-2014 12:38:10.37 | 0 | 0 |
| 2 | D_ID_1 | Sales analysis | G_ID_2 | 28-09-2014 12:38:10.37 | 0 | 0 |
| 3 | D_ID_1 | Sales analysis | G_ID_3 | 28-09-2014 12:38:10.37 | 1 | 0 |
| 4 | D_ID_1 | Sales analysis | G_ID_1 | 29-09-2014 12:00:00.00 | 2 | 0 |
| 5 | D_ID_1 | Sales analysis | G_ID_3 | 29-09-2014 12:00:00.00 | 2 | 0 |

| ID | SEQUENCE | USER CUID | IS OWNER | COUNT |
|---|---|---|---|---|
| 1 | 1 | U_ID_1 | True | 0 |
| 3 | 1 | U_ID_3 | False | 1 |
| 3 | 2 | U_ID_4 | False | 3 |
| 4 | 1 | U_ID_1 | False | 1 |
| 5 | 1 | U_ID_4 | False | 1 |

| ID | DOCUMENT CUID | DOCUMENT NAME | GROUP CUID | MODIFIED TIME | EVENT TYPE | RANK |
|---|---|---|---|---|---|---|
| 1 | D_ID_1 | Quarterly Results | G_ID_1 | 28-09-2014 12:38:10.37 | 0 | 0 |
| 2 | D_ID_1 | Quarterly Results | G_ID_2 | 28-09-2014 12:38:10.37 | 0 | 0 |
| 3 | D_ID_1 | Quarterly Results | G_ID_3 | 28-09-2014 12:38:10.37 | 0 | 0 |
| 4 | D_ID_1 | Quarterly Results | G_ID_1 | 29-09-2014 12:00:00.00 | 3 | 0 |
| 5 | D_ID_1 | Quarterly Results | G_ID_3 | 29-09-2014 12:00:00.00 | 3 | 0 |

| ID | SEQUENCE | USER CUID | IS OWNER | COUNT |
|---|---|---|---|---|
| 1 | 1 | U_ID_1 | True | 0 |
| 4 | 1 | U_ID_6 | False | 4 |
| 5 | 1 | U_ID_7 | False | 6 |

| ID | DOCUMENT CUID | DOCUMENT NAME | GROUP CUID | MODIFIED TIME | EVENT TYPE | RANK |
|---|---|---|---|---|---|---|
| 1 | D_ID_1 | Sales Analysis | G_ID_1 | 30-09-2014 12:38:10.37 | 1 | 5 |
| 2 | D_ID_2 | Quarterly Results (Q1) | G_ID_1 | 28-09-2014 12:38:12.37 | 0 | 4 |
| 3 | D_ID_3 | Income Data | G_ID_1 | 28-09-2014 12:38:10.37 | 1 | 2 |
| 4 | D_ID_4 | Financial | G_ID_1 | 29-09-2014 12:00:12.43 | 1 | 3 |
| 5 | D_ID_2 | Quarterly Results (Q1) | G_ID_1 | 29-09-2014 1:00:00.00 | 3 | 0 |
| 6 | D_ID_3 | Income Data | G_ID_1 | 28-09-2014 7:38:10.37 | 3 | 0 |
| 7 | D_ID_4 | Financial | G_ID_1 | 28-09-2014 9:42:09.56 | 3 | 0 |
| 8 | D_ID_2 | Quarterly Results (Q1) | G_ID_1 | 28-09-2014 12:38:10.37 | 2 | 0 |
| 9 | D_ID_5 | Quarterly Results (Q2) | G_ID_1 | 29-09-2014 7:00:00.00 | 1 | 1 |
| 10 | D_ID_5 | Quarterly Results (Q2) | G_ID_1 | 29-09-2014 9:00:00.00 | 3 | 0 |
| 11 | D_ID_6 | Sample Report | G_ID_1 | 29-09-2014 12:00:00.00 | 1 | 6 |
| 12 | D_ID_7 | Reporting Chart | G_ID_1 | 27-09-2014 12:00:00.00 | 1 | 7 |

| ID | SEQUENCE | USER CUID | IS OWNER | COUNT |
|---|---|---|---|---|
| 1 | 1 | U_ID_1 | False | 3 |
| 2 | 1 | U_ID_2 | True | 0 |
| 3 | 1 | U_ID_1 | False | 4 |
| 4 | 1 | U_ID_3 | False | 5 |
| 5 | 1 | U_ID_1 | False | 2 |
| 6 | 1 | U_ID_2 | False | 4 |
| 7 | 1 | U_ID_2 | False | 5 |
| 8 | 1 | U_ID_5 | False | 3 |
| 9 | 1 | U_ID_2 | False | 5 |
| 10 | 1 | U_ID_3 | False | 3 |
| 11 | 1 | U_ID_1 | False | 4 |
| 12 | 1 | U_ID_2 | False | 4 |

| Document Identifier | Search Count | View Count | Rank |
|---|---|---|---|
| D_ID_1 | 0 | 3 | 5 |
| D_ID_2 | 3 | 0 | 4 |
| D_ID_3 | 3 | 4 | 2 |
| D_ID_4 | 3 | 1 | 3 |
| D_ID_5 | 3 | 5 | 1 |
| D_ID_6 | 0 | 3 | 6 |
| D_ID_7 | 0 | 3 | 7 |

FIG. 37

GENERATING SECURED RECOMMENDATIONS FOR BUSINESS INTELLIGENCE ENTERPRISE SYSTEMS

BACKGROUND

The present disclosure relates to business intelligence enterprise systems, and in particular, to generating secured recommendations for business intelligence enterprise systems.

Unless otherwise indicated herein, the approaches described in this section are not prior art to the claims in this application and are not admitted to be prior art by inclusion in this section.

Enterprise systems are large-scale software applications that help enterprises run their businesses by maintaining information pertaining to various business processes such as manufacturing, sales, distribution, analytics, etc. These individual processes are so large, that, in a typical enterprise, large teams maintain these systems. Also, there will be a large number of reports to analyze the data. However, it is undesirable to allow all the users to have rights to see or modify all the business artifacts. Accordingly, the systems include user management to grant users access to data needed by the users to perform their tasks. Even with user management limiting the data that a user can access, the user still has access to a large amount of data. The quantity of data can be burdensome for a user to determine what data to access.

Thus, there is a need for improved document use of business intelligence systems. The present invention solves these and other problems by providing methods and systems for generating secured recommendations for business intelligence enterprise systems.

SUMMARY

Embodiments of the present invention improve generating secured recommendations for business intelligence enterprise systems.

In some embodiments, a computer-implemented method for recommending documents to a user, the method comprises determining, by a computer, audit logs entries that are associated with members of a group that includes the user as a member, each audit log entry is associated with a file that a member of the group has accessed; analyzing, by the computer, the associated audit log entries; and generating, by the computer, a recommendation of at least one file for the user based on the analyzing of the associated audit log entries.

In some embodiments, the audit log entries include search information of the members of the group.

In some embodiments, generating a recommendation includes generating a recommendation to the user of the group based on search information of other members of the group.

In some embodiments, analyzing the associated audit log entries includes determining files having a highest number of views by members of the group.

In some embodiments, analyzing the associated audit log entries includes determining times that files are viewed by members of the group, and generating a recommendation includes generating a recommendation based on a number of times that files are viewed by members of the group.

In some embodiments, analyzing the associated audit log entries includes determining schedule events of filed viewed by members of the group, and generating a recommendation includes generating a recommendation based on the schedule events.

In some embodiments, a non-transitory computer readable storage medium embodying a computer program for performing a method. The method comprises determining, by a computer, audit logs entries that are associated with members of a group that includes the user as a member, each audit log entry is associated with a file that a member of the group has accessed; analyzing, by the computer, the associated audit log entries; and generating, by the computer, a recommendation of at least one file for the user based on the analyzing of the associated audit log entries.

In some embodiments, a computer system comprises one or more processors and a software program, executable on the computer system. The software program is configured to determine audit logs entries that are associated with members of a group that includes the user as a member, each audit log entry is associated with a file that a member of the group has accessed; analyze the associated audit log entries; and generate a recommendation of at least one file for the user based on the analyzing of the associated audit log entries.

The following detailed description and accompanying drawings provide a better understanding of the nature and advantages of the present invention.

BRIEF DESCRIPTION OF THE DRAWINGS

FIG. 7 is a block diagram illustrating a recommendation header table according to some embodiments.

FIG. 8 is a block diagram illustrating a recommendations detail table according to some embodiments.

FIG. 11 is a diagram illustrating a recommendation header table for a newly created event according to some embodiments.

FIG. 12 is a diagram illustrating a recommendation detail table for a newly created event according to some embodiments.

FIG. 13 is a diagram illustrating a recommendation header table for a most viewed document event according to some embodiments.

FIG. 14 is a diagram illustrating a recommendation detail table for a most viewed document event according to some embodiments.

FIG. 15 is a diagram illustrating a recommendation header table 514 for a most viewed document event according to some embodiments.

FIG. 16 is a diagram illustrating a recommendation detail table for a most viewed document event according to some embodiments.

FIG. 17 is a diagram illustrating a recommendation header table for a most viewed document event according to some embodiments.

FIG. 18 is a diagram illustrating a recommendation detail table for a most viewed document event according to some embodiments.

FIG. 19 is a diagram illustrating a recommendation header table for a most viewed document event according to some embodiments.

FIG. 20 is a diagram illustrating a recommendation detail table for a most viewed document event according to some embodiments.

FIG. 21 is a diagram illustrating a recommendation header table for a most viewed document event according to some embodiments.

FIG. 22 is a diagram illustrating a recommendation detail table for a most viewed document event according to some embodiments.

FIG. 23 is a diagram illustrating a recommendation header table for a most viewed document event according to some embodiments.

FIG. 24 is a diagram illustrating a recommendation detail table for a most viewed event according to some embodiments.

FIG. 25 is a diagram illustrating a recommendation header table for scheduled event according to some embodiments.

FIG. 26 is a diagram illustrating a recommendation detail table for a scheduled event according to some embodiments.

FIG. 27 is a diagram illustrating a recommendation header table for a search history event according to some embodiments.

FIG. 28 is a diagram illustrating a recommendation detail table for a search history event according to some embodiments.

FIG. 35 is a diagram illustrating a recommendation header table for ranking according to some embodiments.

FIG. 36 is a diagram illustrating a recommendation detail table for ranking according to some embodiments.

FIG. 37 is a diagram illustrating a summary table of results of the ranking of FIGS. 34A and 34B.

DETAILED DESCRIPTION

Described herein are techniques for generating secured recommendations for business intelligence enterprise systems. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
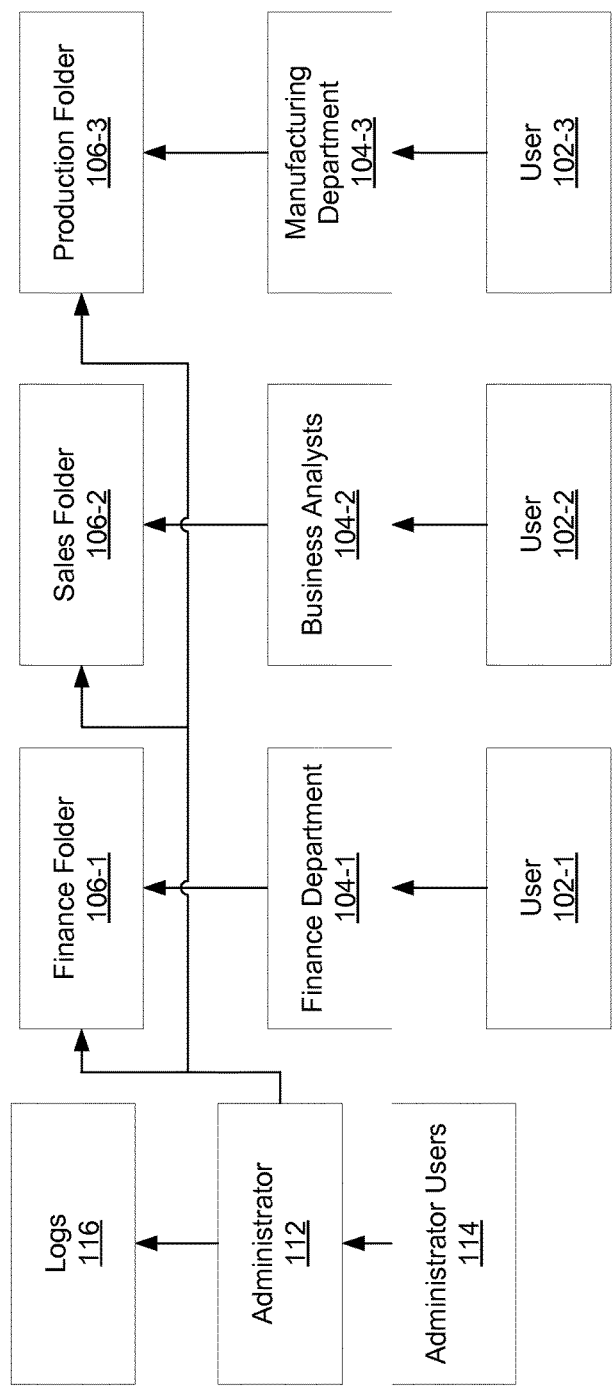
FIG. 1 is a block diagram illustrating a business intelligence enterprise system according to some embodiments.

FIG. 1 is a block diagram illustrating a business intelligence enterprise system 100 according to some embodiments. Enterprise system 100 comprises a plurality of users 102, a plurality of groups 104, a plurality of folders 106, an administrator 112, a plurality of administrator users 114, and a plurality of logs 116.

Enterprise system 100 includes security management or user management to grant users 102 access to the data that the users need to perform their tasks. Enterprise system 100 may generate access rights for groups 104, and provide access to a group 104 to users 102 that are assigned to that group 104. In some embodiments, users 102 assigned to a group 104 inherit the rights of the group 104.

Enterprise system 100 generates audit logs stored in logs 116 based on logging in an audit table or audit database each action performed by a user 102 of the enterprise system 100. Enterprise system 100 generates recommendations to users 102 based on the access rights determined by security management and audit logs.

Folders 106 comprise a plurality of data files, reports, and the like. For simplicity, FIG. 1 shows only three folders 106, namely, finance folder 106-1, sales folder 106-2, and production folder 106-3.

Each group 104 has access rights to contents of one or more folders 106. In this example, each group 104 has access rights to one folder 106.

Users 102 may belong to a group 104. In this example, users 102-1 belong to finance department group 104-1, which has access rights to finance folder 106-1, users 102-2 belong to business analysts group 104-2, which has access rights to sales folder 106-2, and users 102-3 belong to manufacturing department group 104-3, which has access rights to production folder 106-3.

In this example, all users 102 belonging to a group 104 have the same access rights to the corresponding folder 106. Accordingly, in some situations, the users 102 in a group 104 work on the same slice of the data. In this example, access rights to a folder 106 are assigned to groups 104. Users 102 who belong to these groups 104 inherit the rights which are assigned to these groups 104.

Administrator 112 controls the access rights to folders 106 in response to administrator users 114. Administrator 112 maintains logs 116 for all communications by groups 104 with folders 106.

Figure 2:
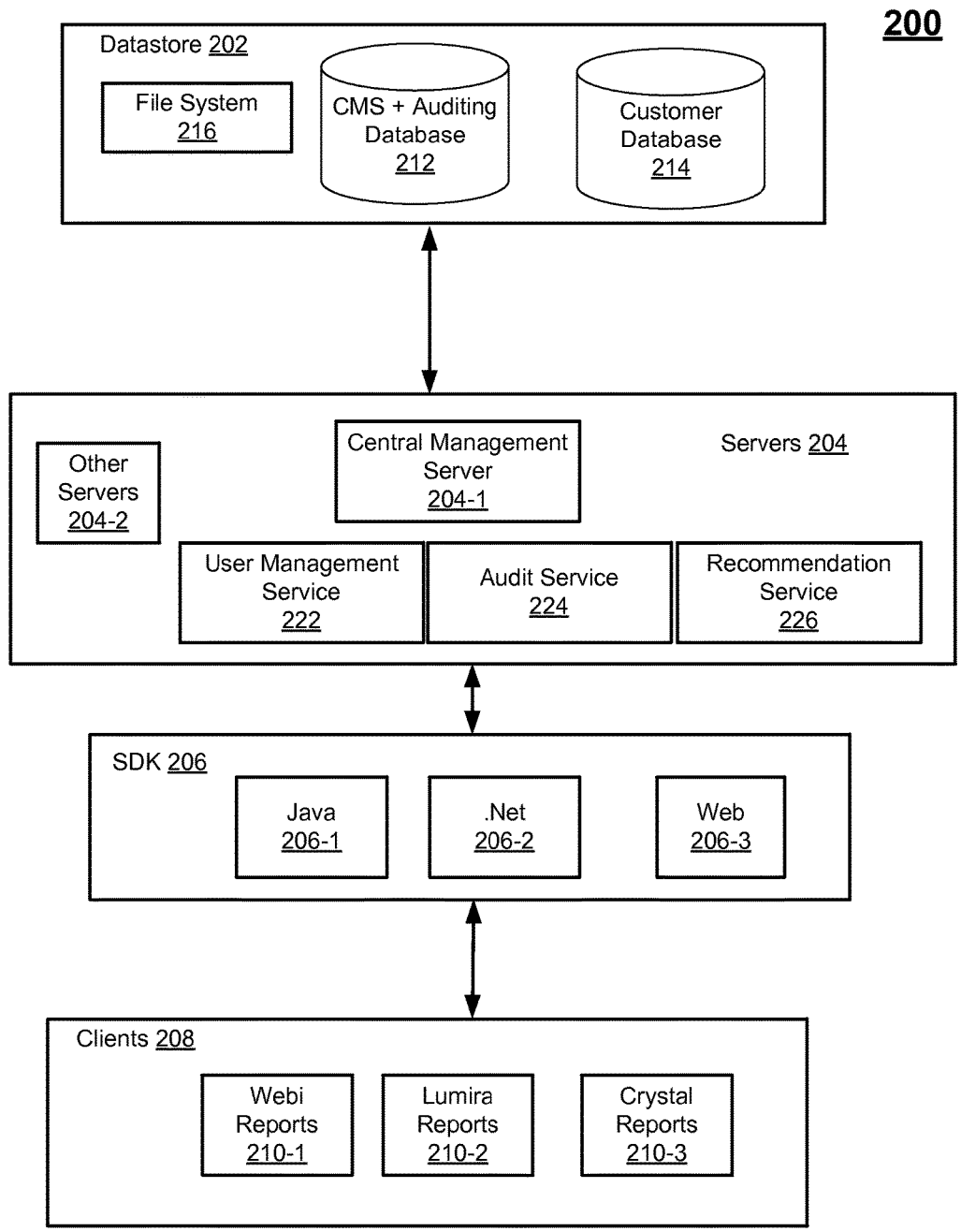
FIG. 2 is a block diagram illustrating a business intelligence enterprise system according to some embodiments.

FIG. 2 is a block diagram illustrating an enterprise system 200 according to some embodiments. Enterprise system 200 comprises a datastore 202, a plurality of servers 204, a software development kit (SDK) 206, and a plurality of clients 208. Enterprise system 200 can be used to implement enterprise system 100.

Datastore 202 includes a central manager server (CMS) database 212 that stores the artifacts (such as reports) for the enterprise system 200. CMS database 212 may also include audit logs. In some embodiments, the audit log includes a log of each and every event that occurs in enterprise system 200.

Datastore 202 also include a customer database 214 that stores the data on which the artifacts (such as reports) are built.

Datastore 202 further includes a file system 216 that is an Operating System provided storage, where data is stored in the form of files.

The plurality of servers 204 perform various operations with datastore 202. The operations may include, for example, fetching data from datastore 202 or updating data in datastore 202.

A central management server 204-1 maintains CMS database 212. Central management server 204-1 includes a set of services 222, which are used by other servers 204-2 via SDK 206. In various embodiments, services 222 include a user management server 222, an audit service 224, and a recommendation service 226. User management server 222 controls and manages commands and requests from users 102 and administrative users 114. Audit service 224 performs the operations for generating logs 116 and audit logs. Recommendation service 226 generates recommendations of files for users 102 of groups 104.

SDK 206 provides software development tools that assist clients 208 use services provided by servers 204. SDK 206 may include, for example, software development tools 206-1, 206-2, and 206-3, which may be, for example, Java®, .Net, and Web, respectively.

Clients 208 use SDK 206 to access services provided by servers 204. Clients 208 may include various client applications to create artifacts (e.g., reports) and maintain enterprise system 200. Clients 208 may include, for example, client applications 210-1, 210,2, and 210-3 to generate web intelligence reports (e.g., Webi), data virtualization reports (e.g., Lumira), and interactive reports (e.g., Crystal).

Enterprise system 200 assists users 102 by providing them knowledge of what other users 102 in the same group 104 are doing. Because users in a group have the equal access rights, the other users will not be viewing data that they should not be viewing.

Enterprise system 200 uses audit events, filters the audit events based on security rights, and generates recommendations for users 102 based on usage analytics data from the audit events.

Recommendation service 226 may generate recommendations based on one or more artifacts, such as newly created documents, most viewed documents by all users, most recently used by logged in user, recent scheduled documents which can be accessed by users with the group, and key words in the search history by users 102 within a group 104. Each document, user and group has a unique ID, which is referred as CUID.

Figure 3:
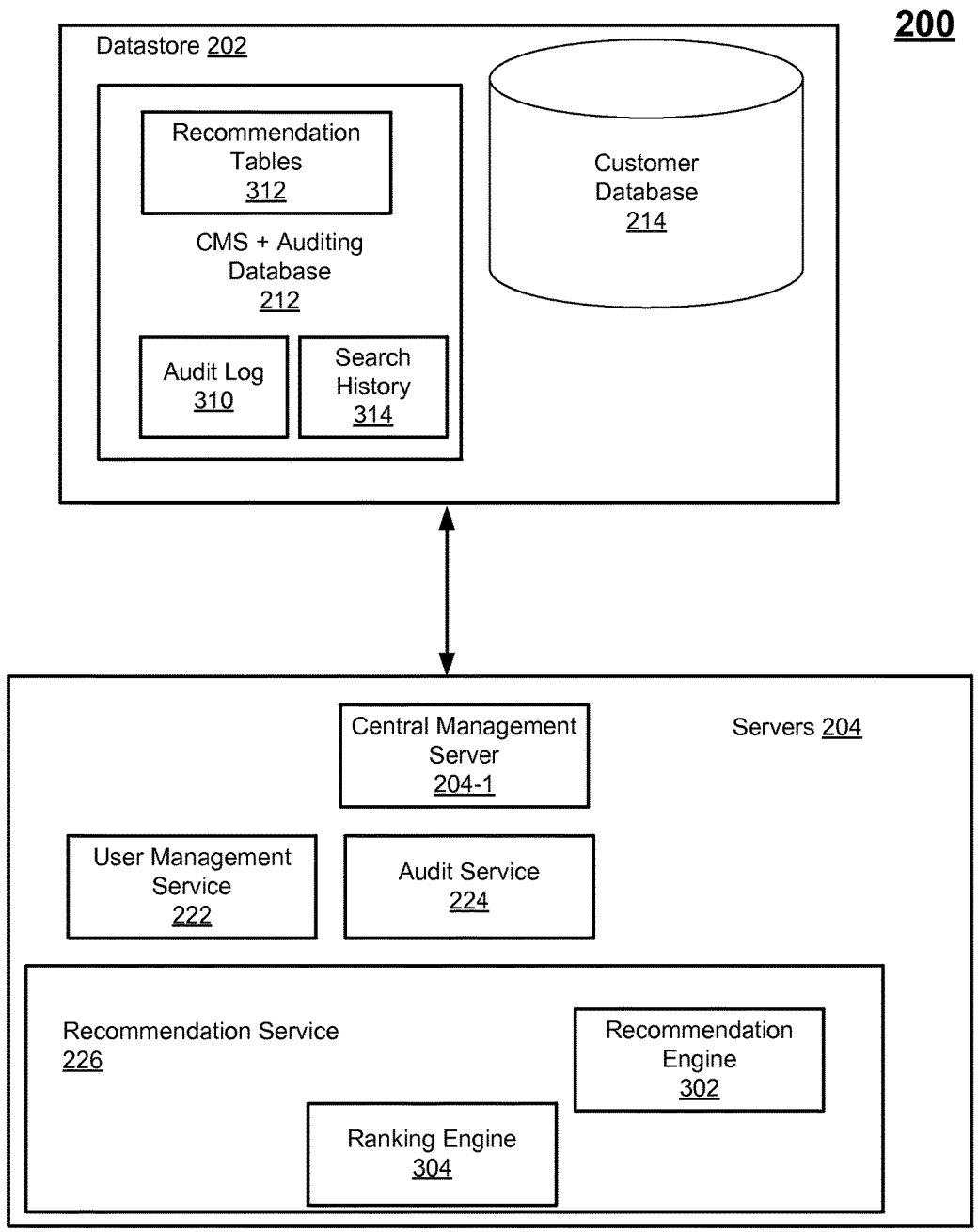
FIG. 3 is a block diagram illustrating more details of the enterprise system of FIG. 2 according to some embodiments.

FIG. 3 is a block diagram illustrating more details of an enterprise system 200 according to some embodiments. For simplicity and clarity, some features of enterprise system 200 are not shown in FIG. 3.

Central manager server (CMS) database 212 includes an audit log 310, a recommendation table 312, and a search history log 314. In some embodiments, audit log 310 includes a log of each and every event that occurs in enterprise system 200. Audit service 224 performs the operations for generating logs 116 and audit log 310. Recommendation service 226 uses audit log 310 to generate recommendations. For simplicity, recommendation service 226 may be described below as retrieving audit logs. Such retrieval may be done directly or through audit service 224. Recommendation service 226 uses the search history stored in search history log 314 to generate recommendations.

Recommendation service 226 includes a recommendation engine 302 that generates recommendations of files for users 102 of groups 104. Recommendation service 226 further includes a ranking engine for ranking recommendations. Recommendation service 226 stores recommendations in recommendation table 312.

By using group based recommendations, enterprise system 200 may provide a starting point for exploring the system to a new user with relatively less experience that tries to access data.

Further, enterprise system 200 may avoid redundancy of artifacts in the system. For example, if user 102 in an administrators group has written a query to find a state of various "servers" in the enterprise system 200, and if a second user 102 also wants to do a similar task, the second user 102 can build on top of the query written by the first user 102.

In some embodiments, enterprise system 200 may provide recommendations for client software, and thereby provide a starting point to users of client software. Some enterprise systems have a large number of client applications to consume the data. Recommendation service 226 may provide recommendations to the user of client software.

By using group based recommendations, enterprise system 200 may be secure, so that users 102 are notified of the content they have rights on.

Recommendation Service

Recommendation service 226 runs a set of queries on the CMS database 212 for analysis for generating suggestions or recommendations of files for user 102. Recommendation service 226 stores the suggestions in the recommendation tables 312. Whenever a user logs in, recommendation service 226 is called to display the relevant documents as recommended items.

The enterprise systems 100 and 200 described herein provide a secured way of providing recommendations within the enterprise system when a user logs in. Recommendation service 226 creates and maintains recommendations. In some embodiments, recommendation service 226 generates the recommendations based on the audit events that are captured as part of various actions. In response to an audit event, recommendation service 226 calculates and resets the rank for the documents that belong to the same group. Recommendation service 226 may prioritize recommendations based on various factors that may include (1) key words used for search by users in a group 104; (2) the most viewed documents by users within a group 104, (3) the most recently created documents within a group 104, (4) the most recently used documents by a user 102, or (5) the recent scheduled documents that can be accessed by users 102 within the group 104.

These recommendations can be used by external clients using the SDK 206 to get the recommendations based on the context of the user credentials provided.

Before describing the operation of recommendation service 226, the auditing and central management server are described.

Figure 4:
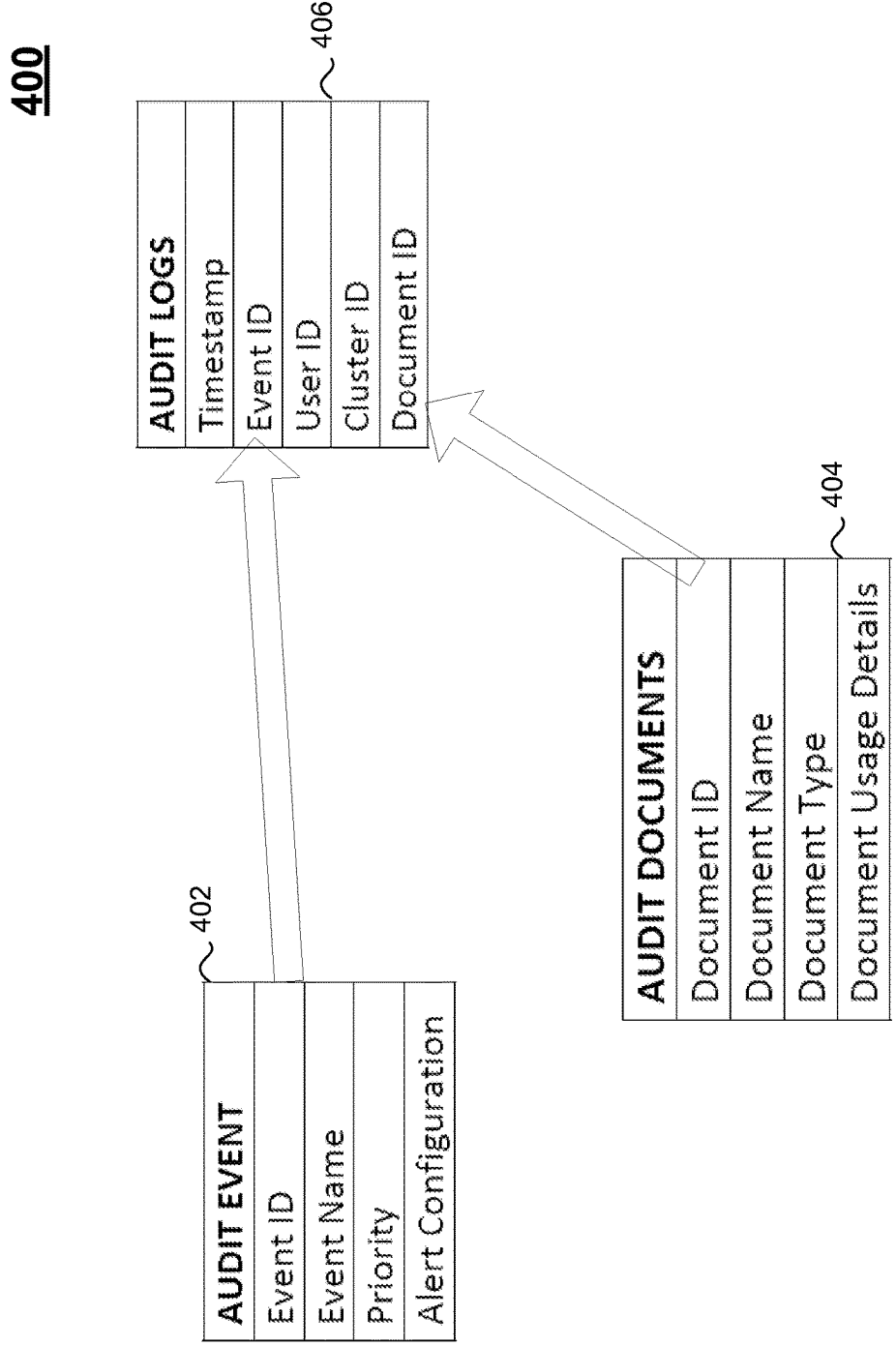
FIG. 4 is a block diagram illustrating an audit database according to some embodiments.

FIG. 4 is a block diagram illustrating an audit database 400 according to some embodiments. CMS database 212 comprises audit log 310 that includes audit database 400 that stores all the events occurring in the enterprise system 100. In some embodiments, the schema of audit database 400 includes an audit event table 402, an audit documents table 404, and an audit logs table 406.

Audit event table 402 includes all the configured events that are to be captured as a part of audit log 310. For example, events include user actions, such as "Document-creation", "Document-refresh", "Document-view", and the like. The priority of the event determines how critical the event is. Based on configured severity, audit service 224 can trigger alerts to various users 102 in the enterprise system 100. Audit event table 402 includes, for example, fields for event identifier, event name, priority of the event, and an alert configuration.

Audit documents table 404 includes document information on which the action was performed by the user. Audit documents table 404 includes, for example, fields for document identifier, document name, document type, and document usage details. The document usage details field may contain internal details of document usage.

Audit logs table 406 is a transactional table, which has an entry for each event occurring in enterprise system 100. Audit logs table 406 includes, for example, fields for timestamp of the vent occurrence, event identifier of the event (e.g., from audit events table 202), user identifier of the user who performed the action, the cluster identifier, and document identifier of the document on which the action was performed (e.g., from audit documents table 404).

Figure 5:
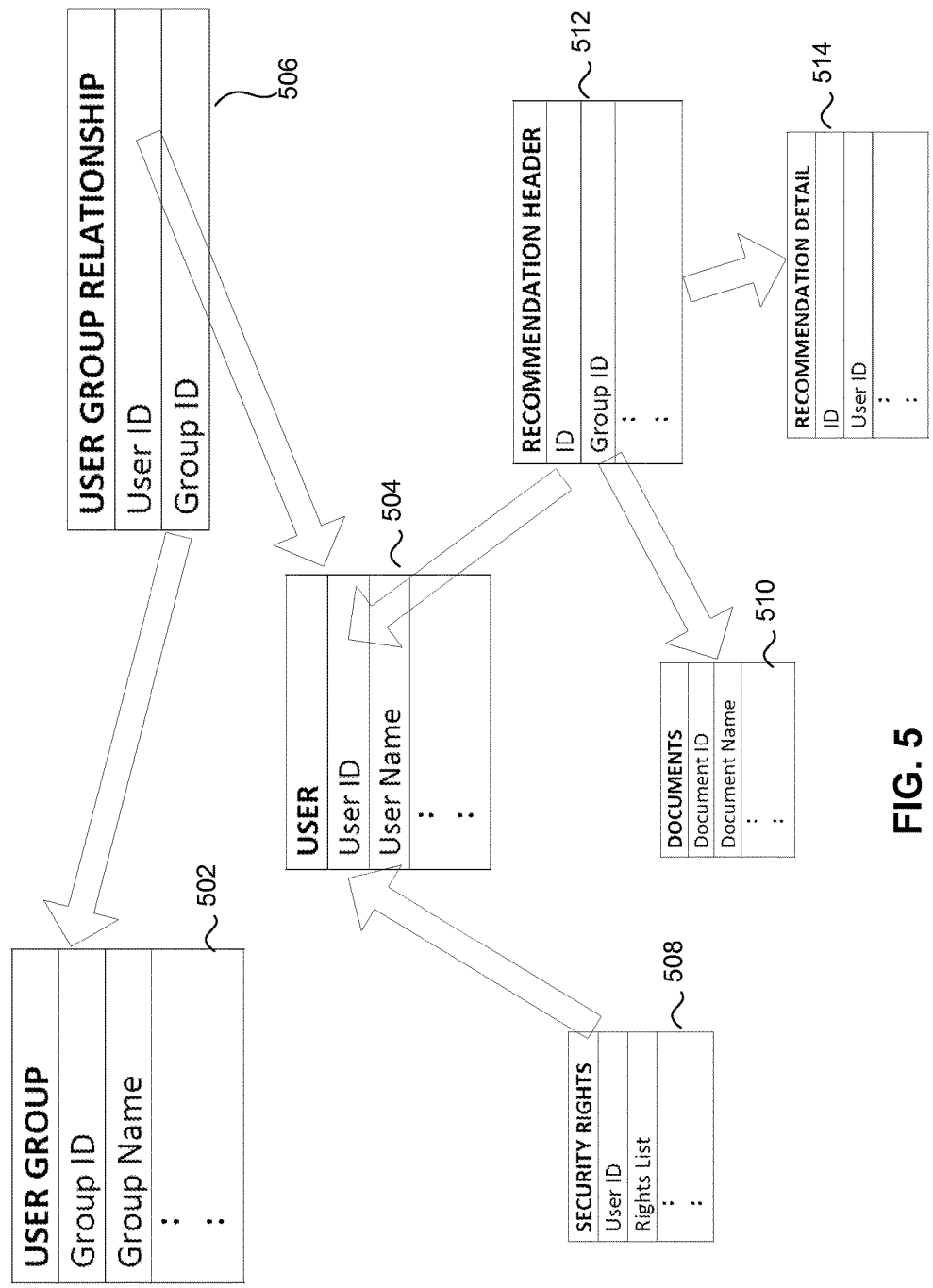
FIG. 5 is a block diagram illustrating tables of user groups, security rights, documents and recommendations according to some embodiments.

FIG. 5 is a block diagram illustrating tables 500 of user groups, security rights, documents and recommendations according to some embodiments. CMS database 212 stores information regarding user groups, security rights and documents in tables 500. Tables 500 includes a user group table 502, a user table 504, a user group relationships table 506, a security rights table 508, a documents table 510, a recommendation header table 512, and a recommendations detail table 514. Recommendation header table 512 and a recommendations detail table 514 are stored in recommendation table 312.

Central management server 204-1 generates recommendations from audit information stored in audit log 310, and user group, security rights and document information stored in tables 500 and stores the recommendations in recommendation header table 512 and recommendations detail table 514.

User group table 502 includes details of user groups 104. The fields of user group table 502 include group identifier and group name.

User table 504 stores information regarding users 102. The fields of user table 504 include user identifier and user name.

User group relationships table 506 stores the relationship between users 102 and groups 104. Central management server 204-1 and recommendation service 226 uses user group relationships table 506 to find which users 102 belong to a group 104 and which groups 104 that a user 102 belongs to. The fields of user group relationships table 506 includes user identifier and group identifier.

Security rights table 508 has a list of rights for each user 102 that indicates whether a user has access rights to a particular document. The fields of security rights table 508 include user identifier and rights list.

Documents table 510 lists the documents in datastore 202. The fields of documents table 510 includes document identifier and document name.

Recommendation header table 512 has a list of documents for each user 102. The fields of recommendation header table 512 include recommendation identifier and user identifier. Recommendation header table 512 is described below in more detail in conjunction with FIG. 7.

Recommendations detail table 514 has a list of documents for each user 102. The fields of recommendations detail table 514 include recommendation identifier, user identifier, and document identifier (not shown). Recommendation detail table 514 is described below in more detail in conjunction with FIG. 8.

Although groups 104 are described based on organizational units, such as departments (e.g., human resources, finance, information technology and the like), groups 104 can be based on other features, such as project.

For ease of discussion, users 102 of a group 104 have the same security access to the group 104. Thus, if some users of an organizational unit are not to have the same security access based on respective roles and responsibility of users in the organizational unit, a group can be defined that excludes those users that do not have access. For example, if the organizational unit is a finance department, but only managers are to have access to a set of documents, a new group of finance department managers may be created for the managers. However, enterprise system 100 is not so limited, and can have multiple access right levels for a group. Administrative users 114 assign the respective roles and security rights. So users who belong to the same group will have access rights to the same set of documents. Accordingly, recommendation service 226 generates recommendations based on the documents that might be of interest to a group of users.

Figure 6:
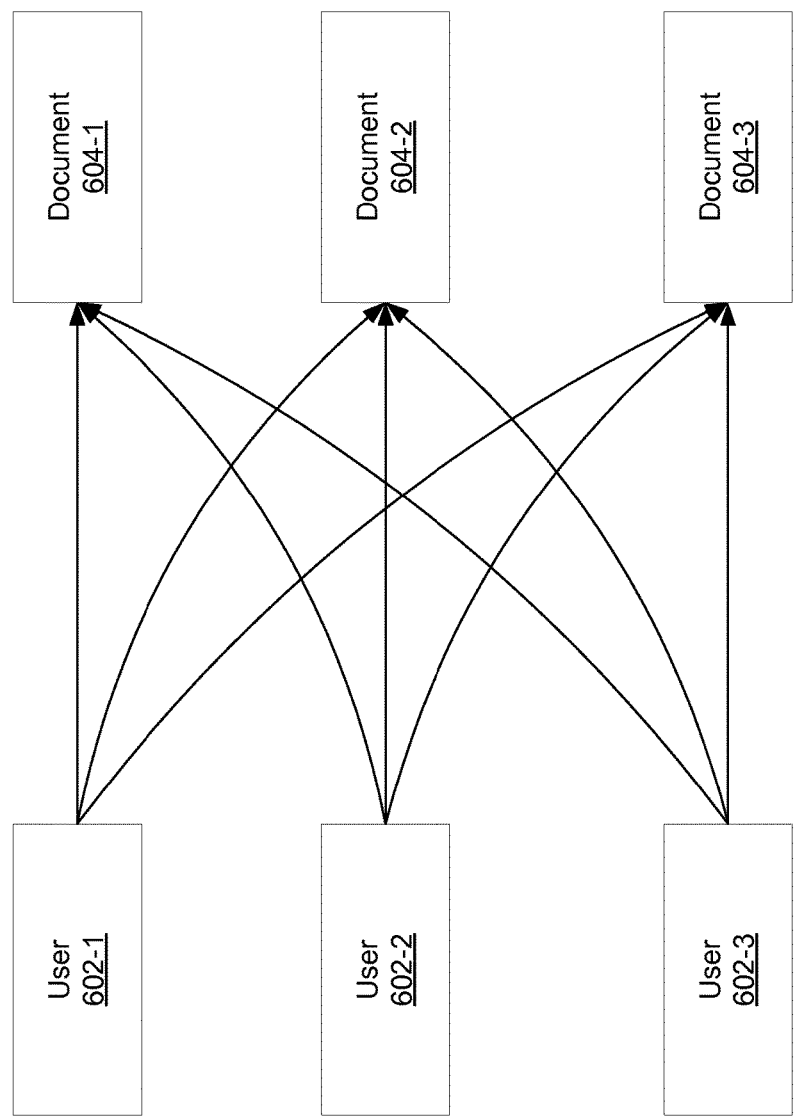
FIG. 6 is a block diagram illustrating relationships between users and documents according to some embodiments.

FIG. 6 is a block diagram illustrating relationships between users and documents according to some embodiments. In this example, three users 602-1, 602-2, and 602-3, which are users 102 (see FIG. 1), belong to one group 104. In this example, three documents 604-1, and 604-2, and 604-3 are created by users 602. In this example, when user 602-1 creates document 604-1, recommendation service 226 notifies the other users 602 of the group 104, namely, user 602-2 and user 602-3, about the creation of document 604-1. In response to users 602-2 and 60-3 viewing document 604-2, recommendation service 226 may recommend document 604-2 to user 602-1. Similarly, whenever a user 602 logs in, recommendation service 226 notifies the user of the most recently used documents 604 by him.

Recommendation service 226 may generate recommendation based on newly created documents, most viewed documents, most recently used documents, scheduled reports, or search history, or any combination thereof.

Recommendation service 226 may provide, for example, on a home page, a default number of recommendations (in this example, five) when user 102 logs in to enterprise system 200 or a user selected number of recommendations. Recommendation service 226 stores a recommendation header table 512, and a recommendations detail table 514 in recommendation table 312.

FIG. 7 is a block diagram illustrating recommendation header table 512 according to some embodiments. In this example, the fields of recommendation header table 512 includes a recommendation identifier, a document customer identifier (CUID), a group customer identifier (CUID), a modified at time, an event type, and a rank.

The recommendation identifier is a unique identifier that represents a row of the table. Each row of the table has a recommendation identifier.

The document CUID is the CUID of the document to which the recommendation points. The group CUID is a unique identifier of the group for which that the recommendation is valid.

The modified at time field represents the time at which the event was triggered which resulted in the creation of the event.

The event type field indicates the type of field, which, in this example, may be create, view, schedule or Search. The field values may be, example, a value of "0" for create, a value of "1" for view, a value of "2" for schedule, and a value of "3" for search.

The rank field is determined by the ranking engine 304 based on various factored that are considered during the computation. The rank is further described below in conjunction with FIGS. 34A and 34B. The value decides the order in which documents are to be displayed in a recommendations display column by enterprise system 200. In this example, the rank field varies from 1 to 20.

FIG. 8 is a block diagram illustrating recommendations detail table 514 according to some embodiments. In this example, the fields of recommendations detail table 514 includes an identifier, a sequence number, a user CUID, a "is owner" indicator, and a counter indicator.

The identifier field includes a unique identifier that represents each row of the recommendation header table 512. The sequence number field includes a running number that is unique for each row with the same identifier. The identifier field and the sequence number field in combination are unique for each row of the recommendation detail table 514.

The user CUID field is a unique CUID of the user 102 that performed the action of create or view. The "is owner" indicator field is a Boolean value that represents the document was created by the user who performed the action. The indicator field represents the number of times the action was performed by the given user 102.

Referring again to FIG. 6, all users 602 have same access rights to all documents 604. In this case, recommendation service 226 classifies all users 604 under one group. In some embodiments, recommendation service provides a recommendation report to users 602-1, 602-2, and 602-3 that includes all documents 604-1, 604-2 and 604-3.

Figure 9:
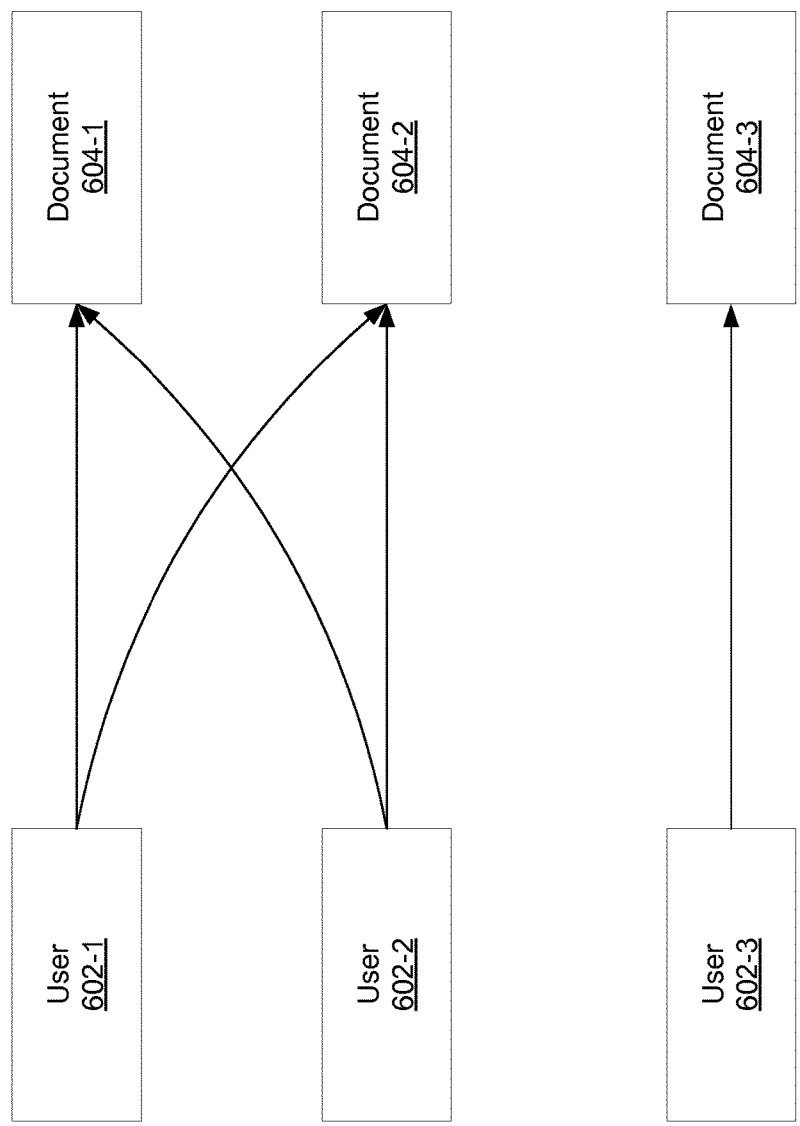
FIG. 9 is a block diagram illustrating relationships between users and documents according to some embodiments.

FIG. 9 is a block diagram illustrating relationships between users and documents according to some embodiments. In the example, users 602-1 and 602-2 have the same access rights to the same set of documents 604-1 and 604-2, but user 602-3 has access rights to different documents, namely document 604-3. In this example, there are two groups, user 604-1 and user 604-2 belong to the same group, and user 604-3 belong to a different group.

Figure 10:
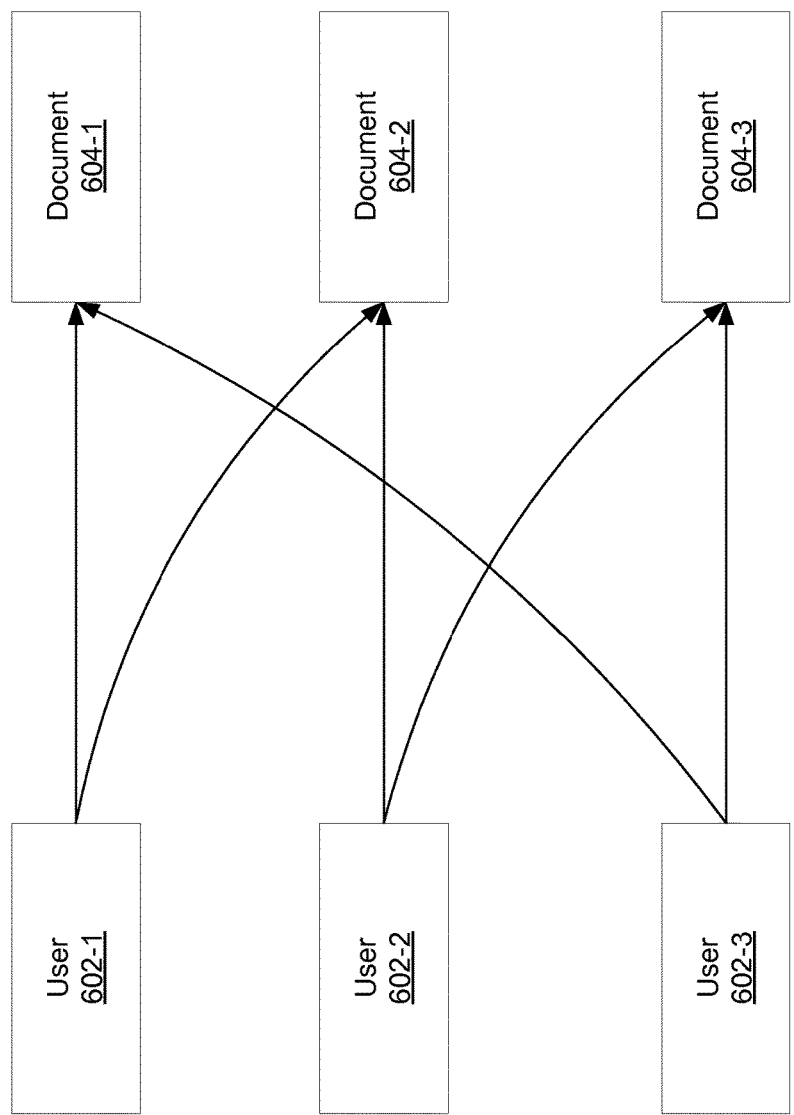
FIG. 10 is a block diagram illustrating relationships between users and documents according to some embodiments.

FIG. 10 is a block diagram illustrating relationships between users and documents according to some embodiments. In the example, users 602-1, 602-2, and 602-3 have access to different sets of documents. Namely, users 601-1 and 602-3 have the same access rights to document 604-1. Users 601-1 and 602-2 have the same access rights to document 604-2. Users 601-2 and 602-3 have the same access rights to document 604-3.

In this example, there are two groups, user 604-1 and 604-2 belong to the same group, and user 604-3 belong to a different group. Accordingly, there are three 3 groups because users 602-1, 602-2, and 602-3 have access to different sets of documents. Thus, any update of any document 604 needs to propagate to users 602 that are outside the group to which the user 602 who performed the update belongs to. For example, if user 602-1 updates document 604-1, document 604-1 becomes a potential recommended document 604 for user 604-1, because both user 602-1 and user 602-3 have access to document 604-1. Consequently, recommendation service 226 calculate the groups 104 to whom recommendations can be published.

Recommendations Based on Event

The generation of recommendations based on various events is described.

1. Recommendations Based on Newly Created Events

In some embodiments, recommendation service 226 generates recommendations based on newly created events.

As an illustrative example, users 602-1, 602-2 and 602-3 belong to the same group (in this example, group G1).

User 602-1 creates a new document based on some data and saves in the folder to which all the other users (in this example, users 602-2 and 602-3) in the group (here, group G1) have access to. An audit event is generated with event type as NEW.

Recommendation service 226 keeps polling the audit log 310 to check for newly generated events. In response to a detection that a new event has been generated, recommendation service 226 determines if it a private document or a document which is accessible to other users as well. In some embodiments, the determination is based on the groups which has access to the folder in which document is saved.

If recommendation service 226 detects a document that can be accessed by at least one user other than the author, recommendation service 226 creates entries in recommendation header table 512 with the CUID and name of the created document, CUID of the group to which document is accessible and the TYPE and RANK (in this example, as 0).

Type 0 stands for create event. Recommendation service 226 creates in recommendation detail table 514 a corresponding row with ID the same as in recommendation header table 512, and sequence (SEQ) as 1 with user CUID and the unique ID of the user, and an initial Count (in this example, zero "0"). Recommendation service 226 updates the IS_OWNER field to true in this example. If the document or the folder in which document is saved can be accessed by multiple groups, recommendation service 226 creates there will be as many records as the number of eligible groups who can view the document in recommendation header table 512. There will be no corresponding detail records in recommendation detail table 514 as no users from these groups have accessed this document yet.

FIG. 11 is a diagram illustrating recommendation header table 512 for a newly created event according to some embodiments. FIG. 12 is a diagram illustrating recommendation detail table 514 for a newly created event according to some embodiments. Recommendation header table 512 shows the data captured when a user with CUID as U_ID_1 who belongs to group G_ID_1 created a document named Sales Analysis with document CUID as D_ID_1 on 28 Sep. 2014 at 12.38. The document was accessible to 2 other groups with CUID as G_ID_2 and G_ID_3.

Recommendation service 226 creates recommendation header table 512 without detail records in recommendation detail table 514 for these 2 groups as shown in FIG. 12.

Recommendation service 226 sets the RANK (in this example, as 1) under the assumption that these are the first recommendations generated for this group. The rank may be generated, for example by the process described below in conjunction with FIGS. 34A and 34B.

In some embodiments, recommendation service 226 deletes a document with type 0 from recommendation header table 512 and recommendation detail table 514 after a certain age (in this example, 5 days) if no other uses have viewed the document (in this example, the count is zero).

2. Recommendations Based on Most Viewed Documents

In some embodiments, recommendation service 226 generates recommendations based on most viewed documents.

Whenever a user 602 opens a document for viewing or editing, recommendation service 226 generates a VIEW event in the audit table 310. Recommendation service 226 creates a record in recommendation header table 512 with type as 1(VIEW), unless the document is a new document. In that case a corresponding record with event_type as 0 already exists in recommendation header table 512, recommendation service 226 increments by one the count in recommendation detail table 514 for the user. If no record exists, recommendation service 226 creates a new detail record in recommendation detail table 514.

Several scenarios that can happen if a record with an event_type exists for a VIEW event are described.

Recommendation header table 512 of FIG. 11 and recommendation detail table 514 of FIG. 12 show the data before recommendation service 226 processes the event.

After each scenario shown in FIGS. 13-28, the changes that happen in recommendation header table 512 and recommendation detail table 514 are marked in BOLD typeface after recommendation service 226 processes the VIEW event.

FIG. 13 is a diagram illustrating recommendation header table 512 for a most viewed document event according to some embodiments. FIG. 14 is a diagram illustrating recommendation detail table 514 for a most viewed document event according to some embodiments.

In this first scenario, there are records with event_type 0 in recommendation header table 512 and only one DETAIL record exists in recommendation detail table 514 with USER as OWNER and count as 0. Thus, the document is a new record but no user has viewed the document yet. In this case if the user who has viewed the document is the same as the one who created the document, then the count in recommendation detail table 514 will be incremented by 1 and the corresponding HEADER record in recommendation header table 512 is updated to have the current timestamp as the modified timestamp.

FIG. 15 is a diagram illustrating recommendation header table 512 for a most viewed document event according to some embodiments. FIG. 16 is a diagram illustrating recommendation detail table 514 for a most viewed document event according to some embodiments.

In a second scenario, there are records with event_type 0 in recommendation header table 512 and only one DETAIL record in recommendation detail table 514 exists with USER as OWNER and count as 0. Thus, the document is a new record but no users have viewed the document yet. In this case if user who viewed the document happens to be different user, recommendation service 226 creates a new DETAIL record in recommendation detail table 514 with ID as in recommendation header table 512 which has group ID to which the user belongs to and next sequence number as SEQ and count as 1. The modified time in the HEADER table will be updated with the current timestamp.

FIG. 17 is a diagram illustrating recommendation header table 512 for a most viewed document event according to some embodiments. FIG. 18 is a diagram illustrating recommendation detail table 514 for a most viewed document event according to some embodiments.

In a third scenario, there are records with event_type 0 in recommendation header table 512 and there are multiple DETAIL records in recommendation detail table 514 existing with different USERs with count greater than 0. Thus, the document is a new record but users have viewed the document. In this case if user who viewed the document happens to have a DETAIL record in recommendation detail table 514, recommendation service 226 increments the count of the record. The modified time in the HEADER table will be updated with the current timestamp.

FIG. 19 is a diagram illustrating recommendation header table 512 for a most viewed document event according to some embodiments. FIG. 20 is a diagram illustrating recommendation detail table 514 for a most viewed document event according to some embodiments.

In a fourth scenario, there are records with event_type 0 in recommendation header table 512 and there are multiple DETAIL records in recommendation detail table 514 existing with different USERs with count greater than 0. Thus, the document is a new record but users have viewed the document. In this case if user who viewed the document does not have a DETAIL record in recommendation detail table 514, recommendation service 226 inserts a new record in recommendation detail table 514 with ID which corresponds to the ID in the HEADER table with group ID as the CUID of the group to which he belongs to and count as 1. The modified time in the HEADER table will be updated with the current timestamp.

FIG. 21 is a diagram illustrating recommendation header table 512 for a most viewed document event according to some embodiments. FIG. 22 is a diagram illustrating recommendation detail table 514 for a most viewed document event according to some embodiments.

In a fifth scenario, there are records with event_type 1 in recommendation header table 512 and there are multiple DETAIL records in recommendation detail table 514 existing with different USERs with count greater than 0. Thus, users have viewed the document. In this case if user who viewed the document does not have a DETAIL record in recommendation detail table 514, recommendation service 226 inserts a new record in recommendation detail table 514 with ID which corresponds to the ID in recommendation header table 512 with group ID as the CUID of the group to which he belongs to and count as 1. If this user happens to be a user who belongs to a group in which user U_ID_3 belongs to, recommendation service 226 updates the modified time with the new timestamp and a new detail record is created in recommendation detail table 514 with same ID which belongs to group G_ID_3 and sequence number as 2.

FIG. 23 is a diagram illustrating recommendation header table 512 for a most viewed document event according to some embodiments. FIG. 24 is a diagram illustrating recommendation detail table 514 for a most viewed document event according to some embodiments.

In a sixth scenario, there are no records in both recommendation header table 512 and recommendation detail table 514. Thus, the document is viewed by this user for first time. Recommendation service 226 creates a new entry in recommendation header table 512 and recommendation detail table 514 with proper CUID's of document, group and user. Count in the DETAIL record of recommendation service 226 will be set to 1.

In each of the six scenarios, recommendation service 226 determines the RANK and updates them in recommendation header table 512. The rank may be generated, for example by the process described below in conjunction with FIGS. 34A and 34B.

3. Recommendations Based on Most Recently Used Items

For this scenario, recommendation service 226 directly queries the audit table 310 for the USER and get the last predetermined number (in this example, three) view events captured in CMS database 212. Recommendation service 226 need not perform a ranking as this is purely based on the recently viewed items for the logged in user. In the order of calculation recently viewed documents are determined first and then the recommended documents.

In some embodiments, there will no overlap between the documents displayed in most recently viewed and recommended documents. Most recently used items are shown separate from recommended items in the user interface (UI). This may be implemented, for example, for consumption from other clients using separate APIs which will be exposed for providing the most recently viewed documents and recommended documents.

4. Recommendations Based on Schedule

FIG. 25 is a diagram illustrating recommendation header table 512 for a scheduled event according to some embodiments. FIG. 26 is a diagram illustrating recommendation detail table 514 for a scheduled event according to some embodiments.

This process is mainly for documents which are scheduled periodically, such as weekly or monthly reports. Scheduling is used to refresh the data in the document created based on the data which currently exists in the customer database 214. This is done to ensure that the frequent updates to the underlying data get updated in the document without any manual intervention. Recommendation service 226 creates a separate entry in recommendation header table 512 with type as 2 which stand for SCHEDULE whenever a schedule event is generated. This is done only for those groups who have records in recommendation header table 512, i.e. at least one user in the group should have accessed that document or owner of the document should belong to the group.

For example, the data in recommendation header table 512 when the SCHEDULE happens for a document named "Sales Analysis" is as below. User with ID U_ID_1 has created the document and users with ID U_ID_3, U_ID_4 who belongs to group G_ID_3 has viewed the document. Recommendation service 226 creates schedule events only for 1st and 3rd group as no users in 2nd group has viewed the document yet. Recommendation service 226 uses the SCHEDULE event to calculate the RANK which decides the order in which documents needs to be displayed in the recommendation window. The rows marked in bold marks the new created records for SCHEDULE. The records remain with RANK 0 throughout. Whenever next schedule happens for the same document, the count is incremented and modified time on the header record is updated.

Recommendation service 226 deletes these records when the original records for the document within the group are deleted.

5. Recommendations Based on Search History

FIG. 27 is a diagram illustrating recommendation header table 512 for a search history event according to some embodiments. FIG. 28 is a diagram illustrating recommendation detail table 514 for a search history event according to some embodiments.

Whenever user 602 performs a search, the keywords are stored in the search history log 314 of the user. Per the search implementation, whenever a document is created or modified indexing is performed on that document to extract the metadata and content. In some embodiments, enterprise system 200 indexes documents using Apache Lucene (open source supported by Apache Software Foundation), which saves document name and each string in the document as indexes. Whenever a document gets created or viewed, recommendation service 226 checks if any of the data from either metadata or content matches the keywords in that document which is used for search in a past predetermined time (in this example, 5 days). If a match is found, recommendation service 226 creates a record in recommendation header table 512 and recommendation detail table 514 with document ID and user ID against which keywords are stored in search history log 314. There will be as many records created as the number of unique group ID to which users who has performed search belongs to. If 5 different users in a group (in this example, G_ID_1) searched for keyword profit, then there will be 1 record in each recommendation header table 512 and recommendation detail table 514. The COUNT in recommendation detail table 514 will be 5 as there are 5 searches which have happened for this keyword.

By way of example, a report named "Quarterly results" is created. The report has columns names "Business Unit", "License revenue", "Service Revenue", "Cost of operations" and "Profit". Say 10 Users 602 searched for "profit" before the report was created and saved to datastore 202. Thus, search history log 314 will have 10 entries captured. Say, for example, 4 users of the 10 users belong to group G_ID_1, and the remaining 6 users belong to group G_ID_3. Per the example implementation search history log 314 stores a predetermined number of last searched keywords (in this example, 20 searched keywords) per user.

When "Quarterly results" is created, recommendation service 226 creates a new record for the NEW Event, as described above in the section for "Recommendation for newly created documents". Along with the new record, recommendation service 226 stores any indexed word for that document that exists in the search history log 314, and creates new records with type as 3 in recommendation header table 512. There will be as many records created as the number of unique groups to which users belongs to. In the corresponding detail records of recommendation detail table 514, recommendation service 226 sets the count to the number of users who have searched for that keyword. Thus, in this example, there will be 2 records created in recommendation header table 512 as shown in FIG. 27 with type as 3 and two detail records in recommendation detail table 514 with counts of 4 and 6, respectively. The User ID will be updated to the CUID of the user who performed the search latter among all. Recommendation service 226 calculates the rank of these records as described below in conjunction with FIGS. 34A and 34B . . . User U_ID_6 belongs to group G_ID_1 and user U_ID_7 belongs to group G_ID_3. The records which are created as part of search are in bold in FIGS. 27 and 28.

Figure 29A:
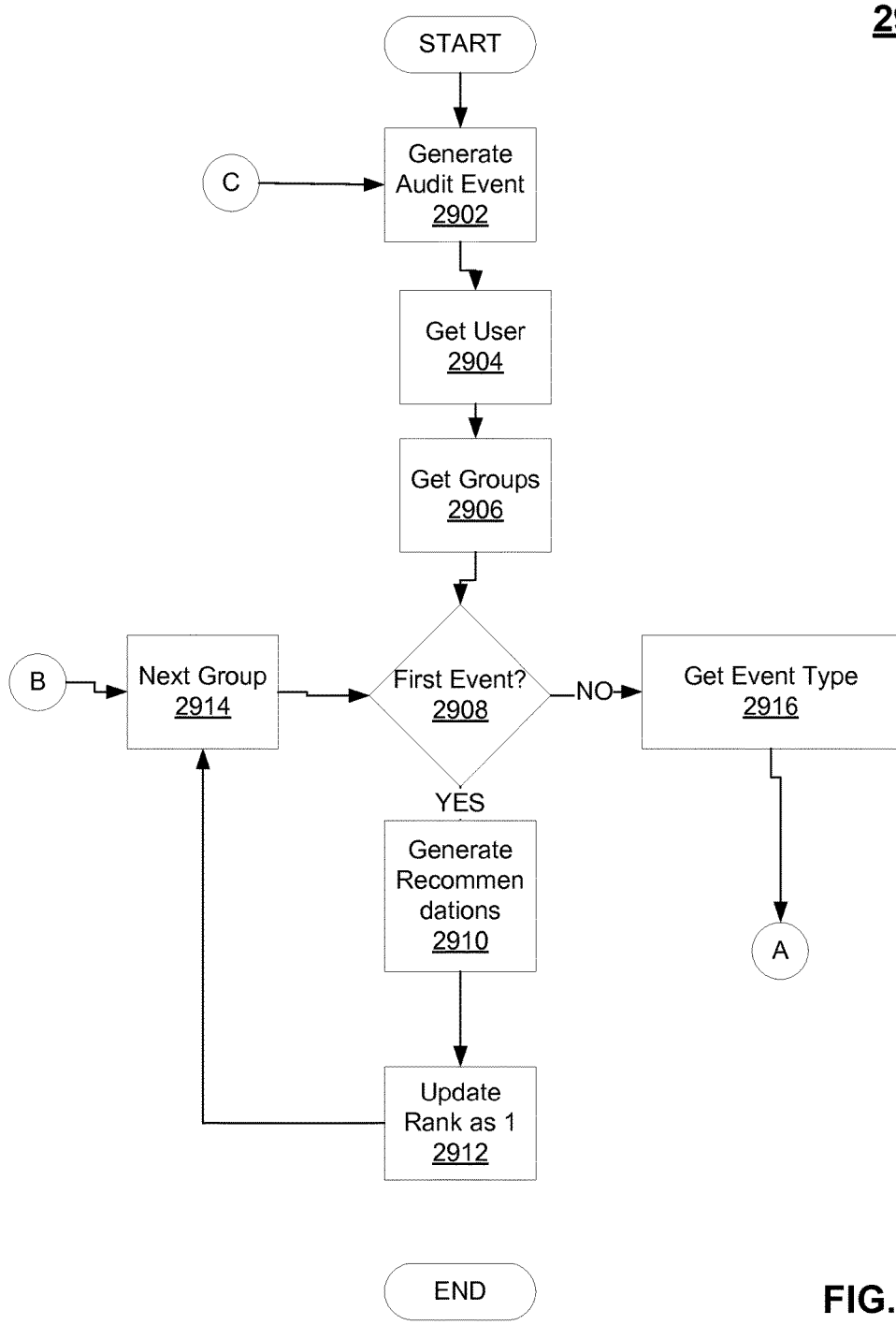
FIGS. 29A and 29B are simplified diagrams illustrating a process flow of processing for processing a new event or a view event in the audit database according to some embodiments.
Figure 29B:
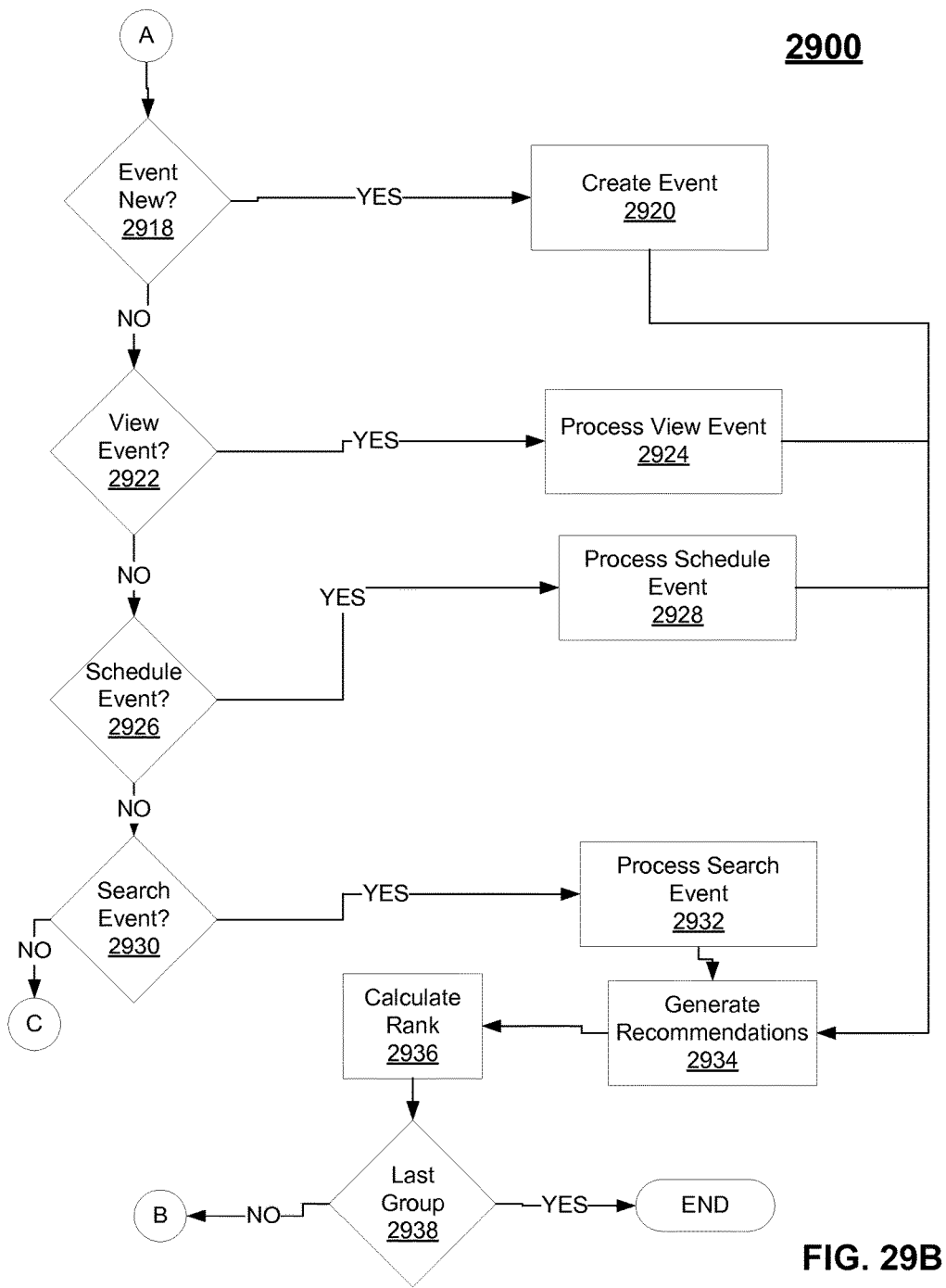

FIGS. 29A and 29B are simplified diagrams illustrating a process flow 2900 of processing for processing a new event or a view event in the audit database according to some embodiments.

At 2902, recommendation service 226 searches for a generated audit event, such as a new event or a view event. At 2904, recommendation service 226 retries user information for the user who performed the action which resulted in the audit event.

At 2906, recommendation service 226 retrieves the eligible groups 104 to which the user belongs. At 2908, recommendation service 226 determines whether the event is the first event. In this example, recommendation service 226 determines whether any records are created in recommendation header table 512 with the group identifier.

If, at 2908, the event is the first event, recommendation service 226 generates, at 2910, recommendations. In this example, recommendation service 226 creates an entry in recommendation header table 512 and recommendation detail table 514. At 2912, recommendation service 226 updates the rank for the event as "1". At 2914, recommendation service 226 proceeds to process the next group for the user.

Otherwise, if at 2908, the event is not the first event, recommendation service 226 retrieves, at 296, the event type. In this example, the event type may be new, view, schedule, or search. Recommendation service 226 processes the event based on the event type.

If, at 2908, the event type is new event, recommendation service 226 creates, at 2920, an event. At 2934, recommendation service 226 generates, at 2934, recommendations. At 2936, recommendation service 226 calculates a rank for the generated recommendation. The rank may be generated, for example by the process described below in conjunction with FIGS. 34A and 34B. If, at 2938, the last group has been processed, recommendation service 226 ends the process flow 2900. Otherwise, if, at 2938, the last group has not been processed, recommendation service 226 processes, at 2914, the next group.

If, at 2918, the event is a create event, recommendation service 226 creates, at 2920, the event by, for example, executing a series of functions related to events with type New. In this example, recommendation service 226 may create an event using the process described below in conjunction with FIG. 30.

If, at 2922, the event is a view event, recommendation service 226 processes, at 2924, the view event by, for example, executing a series of functions related to events with type View. In this example, recommendation service 226 may process a view event using the process described below in conjunction with FIG. 31. Recommendation service 226 generates, at 2934, recommendations as described above.

If, at 2926, the event is a schedule event, recommendation service 226 processes, at 2928, the schedule event by, for example, executing a series of functions related to events with type Schedule. In this example, recommendation service 226 may process a schedule event using the process described below in conjunction with FIG. 32. Recommendation service 226 generates, at 2934, recommendations as described above.

If, at 2930, the event is a search event, recommendation service 226 processes, at 2932, the search event by, for example, executing a series of functions related to events with type Search. In this example, recommendation service 226 may process a search event using the process described below in conjunction with FIG. 33. Recommendation service 226 generates, at 2934, recommendations as described above.

If no event is determined at 2922, 2926 and 2930, recommendation service 226 loops to at 2902, to determine if an audit event has occurred.

Figure 30:
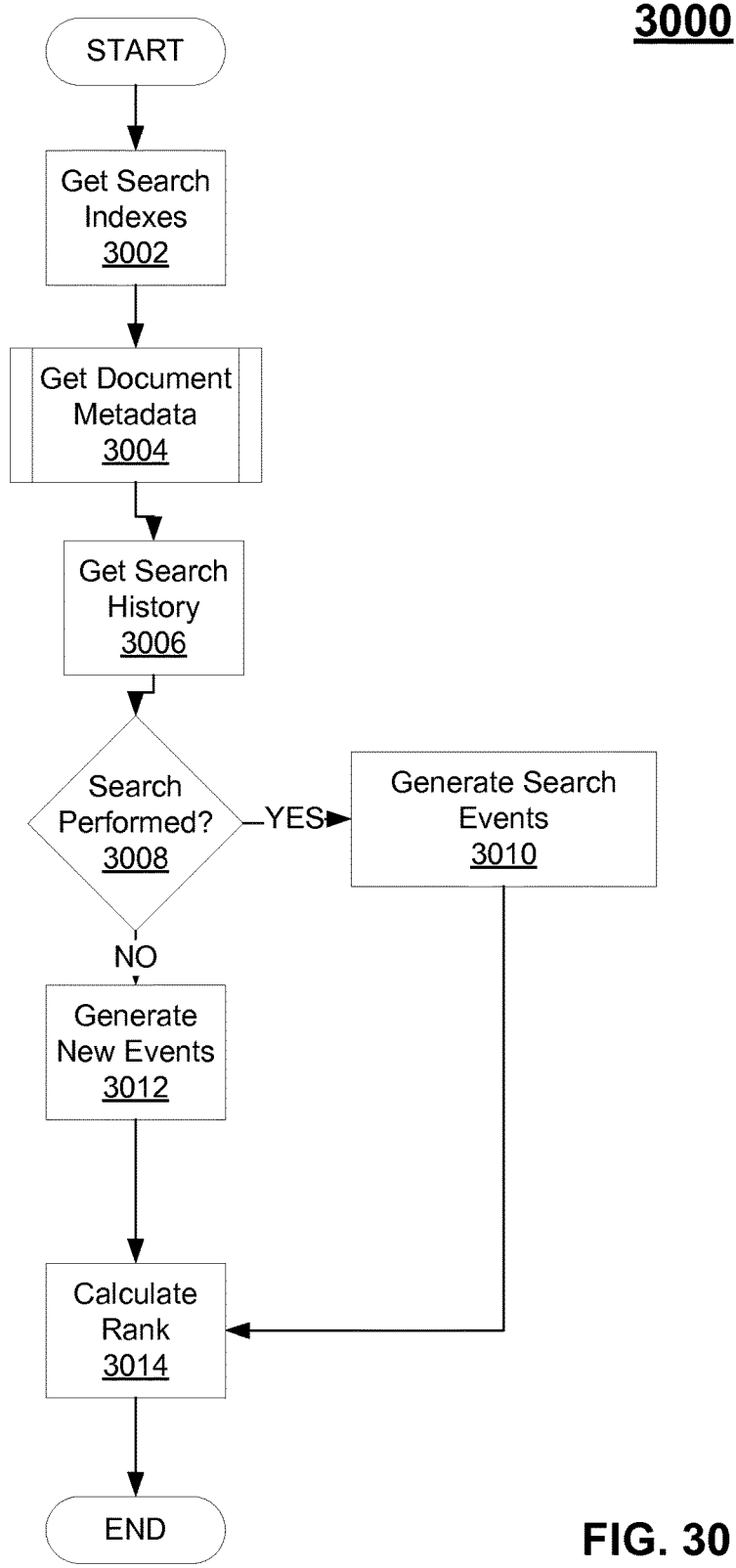
FIG. 30 is a simplified diagram illustrating a process flow of processing for creation of a new document by the audit database according to some embodiments.

FIG. 30 is a simplified diagram illustrating a process flow 3000 of processing for creation of a new document by the audit database according to some embodiments. Process flow 3000 may be invoked in response to process view event at 2924 of FIG. 29.

At 3002, recommendation service 226 retries the search indexes created for the newly created events. Whenever a new document is created, enterprise system 200 indexes the document, which makes it searchable. All the keywords used for indexing are stored in an index file in search history log 314. Recommendation service 226 uses the index file_to get the list of searchable keywords in the newly created document.

At 3004, recommendation service 226 retrieves document metadata. In some embodiments, 3004 is a subprocess of 3002 that retrieves the searchable keywords in the document.

At 3006, recommendation service 226 determines the keywords that belong to the metadata of the document. In some embodiments, the keywords are for searches that occurred during a predetermined time (in this example, n the recent past of 5 days).

At 3008, recommendation service 226 determines whether a search based on the searchable keywords and data from search history log 314. In some embodiments, the determination is made based on whether any search was performed by looking for the existence of any of the searchable keywords in the search history.

If, 3008, a search was performed, recommendation service 226 generates, at 3010, search events. In this example, recommendation service 226 generates recommendation header and detail records with type as SEARCH.

At 3014, recommendation service 226 calculates a rank for the generated search event. The rank may be generated, for example by the process described below in conjunction with FIGS. 34A and 34B.

On the other hand, if, at 3008, no search was performed, recommendation service 226 generates, at 3012, new events, and calculates, at 3014, rank. In this example, recommendation service 226 generates recommendation header and detail records with type as NEW.

Figure 31:
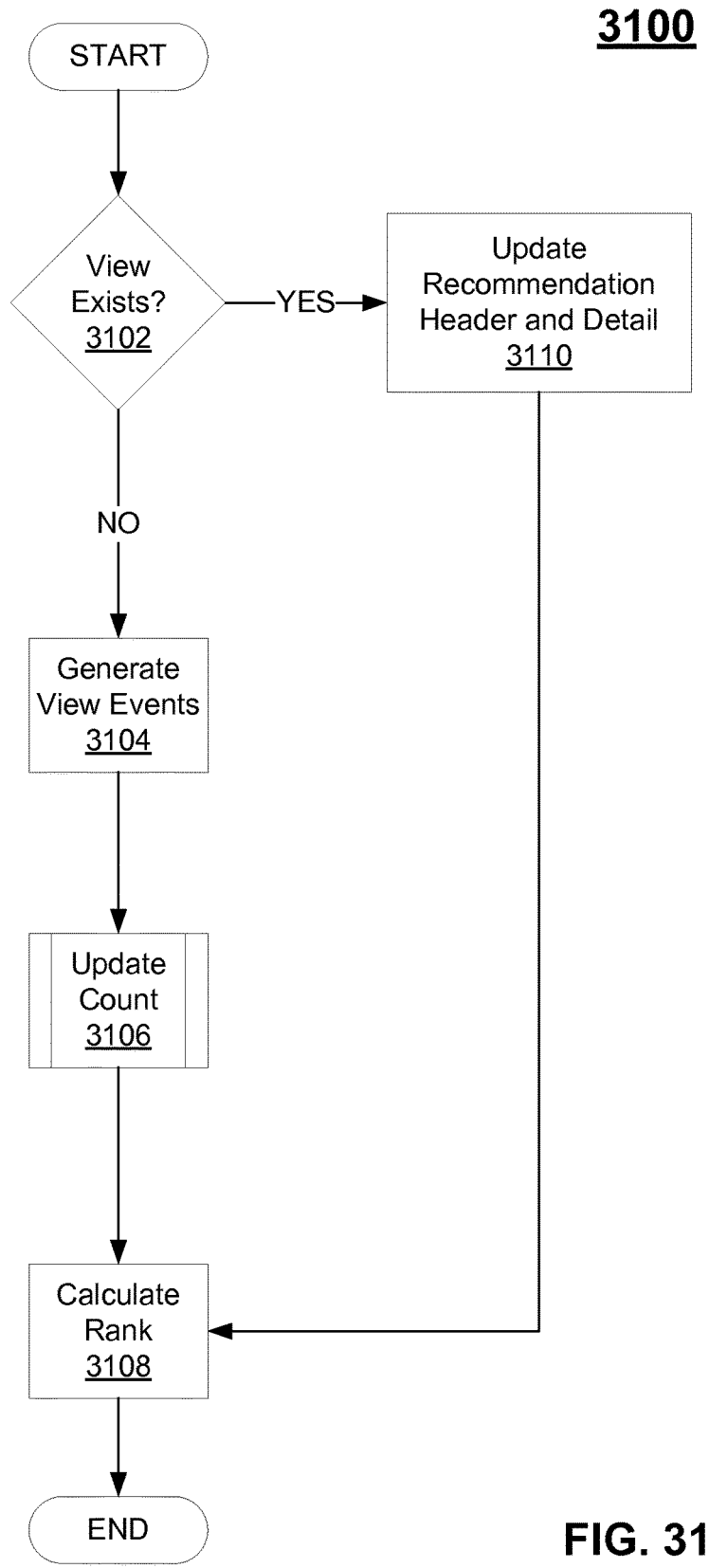
FIG. 31 is a simplified diagram illustrating a process flow of processing a view event by the audit database according to some embodiments.

FIG. 31 is a simplified diagram illustrating a process flow 3100 of processing a view event by the audit database according to some embodiments. Process flow 3100 may be invoked in response to process view event at 2924 of FIG. 29. At 3102, recommendation service 226 determines whether a view exists by checking if there is already a record in the recommendation header table 512 with same group identifier. If, at 3102 a view does not exist, recommendation service 226 generates, at 3104, a view event, for example, by creating a record in recommendation header table 512 and recommendation detail table 514. At 3106, recommendation service 226 updates the count in the recommendation detail table 514 to a value of "1". At 3108, recommendation service 226 calculates a rank for the generated view event. The rank may be generated, for example by the process described below in conjunction with FIGS. 34A and 34B.

On the other hand, if, at 3102 a view does not exist, recommendation service 226 updates, at 3110, the recommendation header table 512 and the recommendation detail table 514, and increments the count in the recommendation detail table 514.

Figure 32:
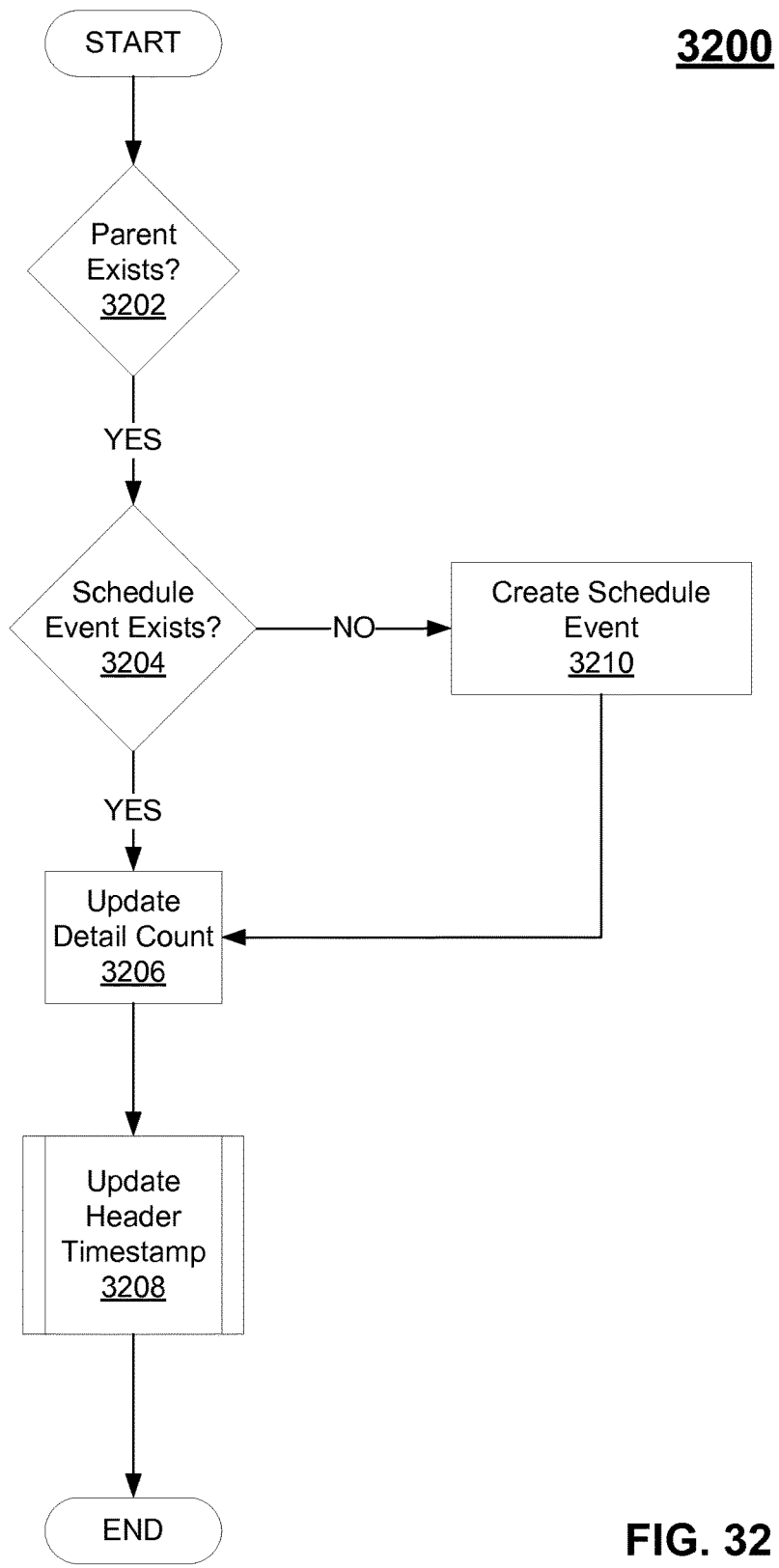
FIG. 32 is a simplified diagram illustrating a process flow of processing scheduling an event by the audit database according to some embodiments.

FIG. 32 is a simplified diagram illustrating a process flow 3200 of processing scheduling an event by the audit database according to some embodiments. Process flow 32 may be invoked in response to process schedule event 2928 of FIG. 29. At 3202, recommendation service 226 determines whether a parent event exists, such as whether any events stored in the recommendation header indicate the event is new or view. In some embodiments, recommendation service 226 determines whether there are any events in the recommendation header table with event type as NEW or VIEW.

If, at 3202, a parent view exist, recommendation service 226 determines, at 3204, a schedule event exists, such as determine if there are already any schedule events existing for the document. If, at 3204 a schedule event does not exist, recommendation service 226 creates, at 3210, a schedule event, for example, by creating a record in recommendation header table 512 and recommendation detail table. In this example, the type is set as "2" to indicate schedule event, and the count is set to zero.

At 3206, recommendation service 226 updates the detail count, for example by Incrementing by 1 the count in the recommendation detail table 514. On the other hand, if at 3204 schedule event exists, recommendation service 226 updates, at 3206, the detail count. At 3208, recommendation service 226 updates the header timestamp.

Figure 33:
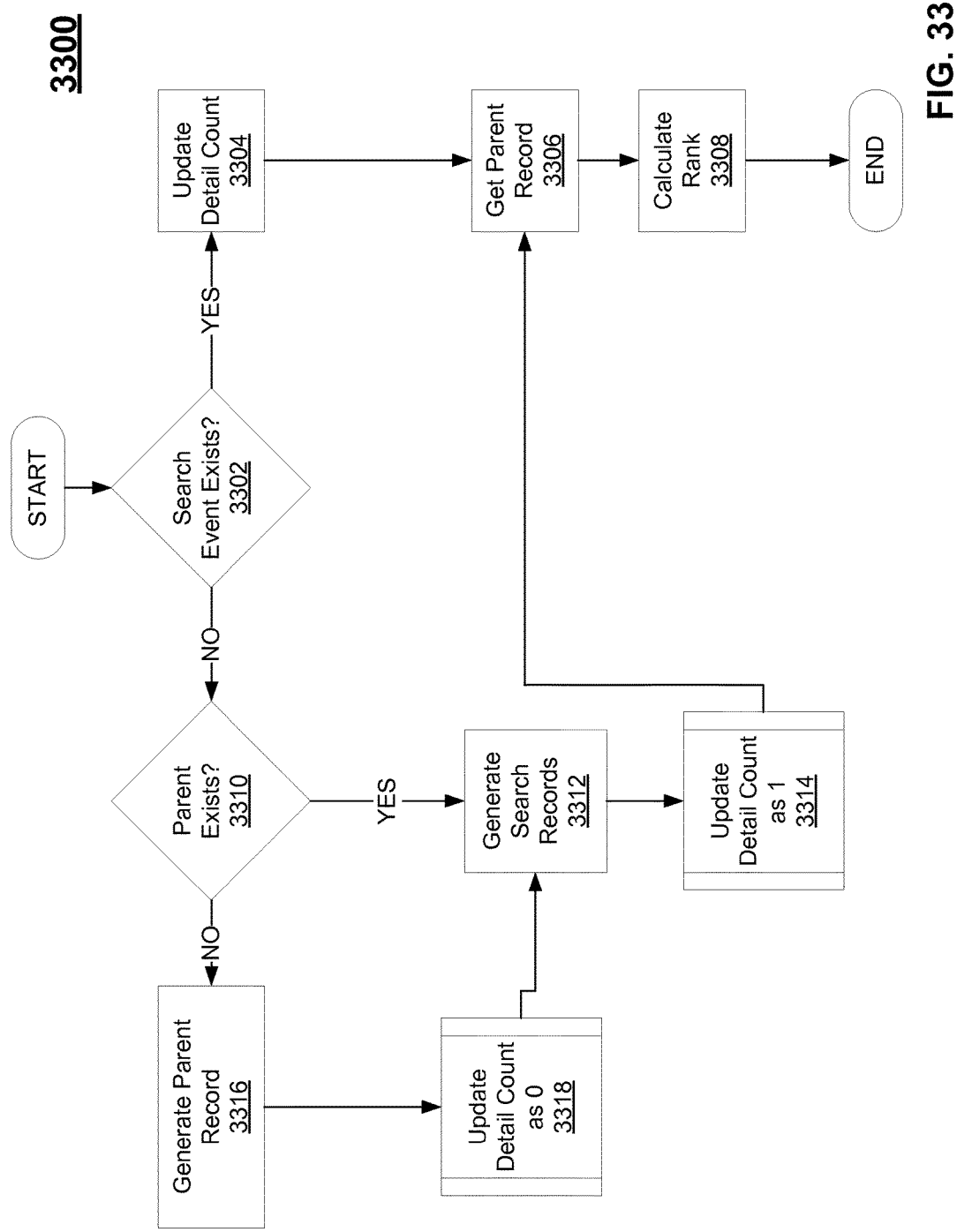
FIG. 33 is a simplified diagram illustrating a process flow of processing a search event by the audit database according to some embodiments

FIG. 33 is a simplified diagram illustrating a process flow 3300 of processing a search event by the audit database according to some embodiments. Process flow 32 may be invoked in response to process search event at 2932 of FIG. 29. At 3302, recommendation service 226 determines whether a search event exists for a document. If at 3302 a search event exists, recommendation service 226 updates, at 3304, the count of the search record in recommendation detail table 514. At 3306, recommendation service 226 retrieves the parent record for the document of the search event from search history table 314. In this example, the event type is NEW or VIEW. At 3308, recommendation service 226 calculates a rank for the generated view event. The rank may be generated, for example by the process described below in conjunction with FIGS. 34A and 34B.

On the other hand, if at 3302, a schedule event does not exist, recommendation service 226 determines, at 3310, whether a parent event exists, such as whether any records for the same document stored in the recommendation header indicate the event is new or view. In some embodiments, recommendation service 226 determines whether there are any events in the recommendation header table with event type as NEW or VIEW.

If, 3310, a parent exists, recommendation service 226 generates, at recommendation header table 512, a new search record, and in this example, with a count of zero. At recommendation detail table 514, recommendation service 226 increments the count in recommendation detail table 514 to a value of "1".

On the other hand, if at 3310 a parent record does not exist, recommendation service 226 generates, at 3316, a parent record for the document for which the search event was generated. In this example, the event record has a type of VIEW. At 3318, recommendation service 226 updates the count in recommendation detail table 514 to a value of "0". and proceeds to the generation of search records at 512.

Recommendation service 226 generates recommendations based on various audit events. Recommendation service 226 generates a rank whenever a record is created or updated.

Recommendation service 226 uses various factors to calculate the rank. The factors include the most visited document by other users in the group. In this example, the most visited document relates to the count in recommendation detail table 514.

Recommendation service 226 may use documents with the highest number of SEARCH hits. In this example, these documents relate to the number of records with an event TYPE as SEARCH with a group.

Recommendation service 226 may use the time of creation of the document compared to other documents. In this example, if multiple documents have same view count and search count, then the document which is newest (based on the created time) is given a higher preference.

Recommendation service 226 may use the frequency of the schedules which occurs for a document. The document that gets refreshed most often is given a higher preference than the other documents. This is considering the fact that the data which is part of the document is getting refreshed frequently compared to others.

Recommendation service 226 may purges the records which are older than a predetermined time (e.g., 5 days). In this example, recommendation service 226 does not recommend or provide the user with a document that has not been viewed during this predetermined time, say the last 5 days.

Recommendation service 226 may recalculate the rank based on any event happening. In this embodiment, the calculations are done upon event occurrence and before the user logging in or requesting a recommendation. Thus, recommendation service 226 directly queries for documents for the same group with the highest rank.

For most recently viewed items, recommendation service 226 may query for those recommendation header records in recommendation header table 512 with the highest rank and latest modified time with User ID in recommendation detail table 514 equal to the user ID of the logged in user.

For recommended items, recommendation service 226 may query for those recommendation header records with highest rank with User ID in 2514 not equal to the user ID of the logged in user.

As described above, in some embodiments, the most viewed documents and the recommendation list are displayed in different lists. This allows different users in a group to receive different recommendations, because the two users had been viewing different documents.

In some embodiments, multiple documents may have the same rank, but within a group there will be only one document with one rank.

In some embodiments, recommendation service 226 may use the event type to determine whether a document will have a rank or be used to calculate rank. In this example, only records with event types as NEW or VIEW have a rank, and other records with Schedule and Search as event type are used to calculate the rank of the event.

Figure 34A:
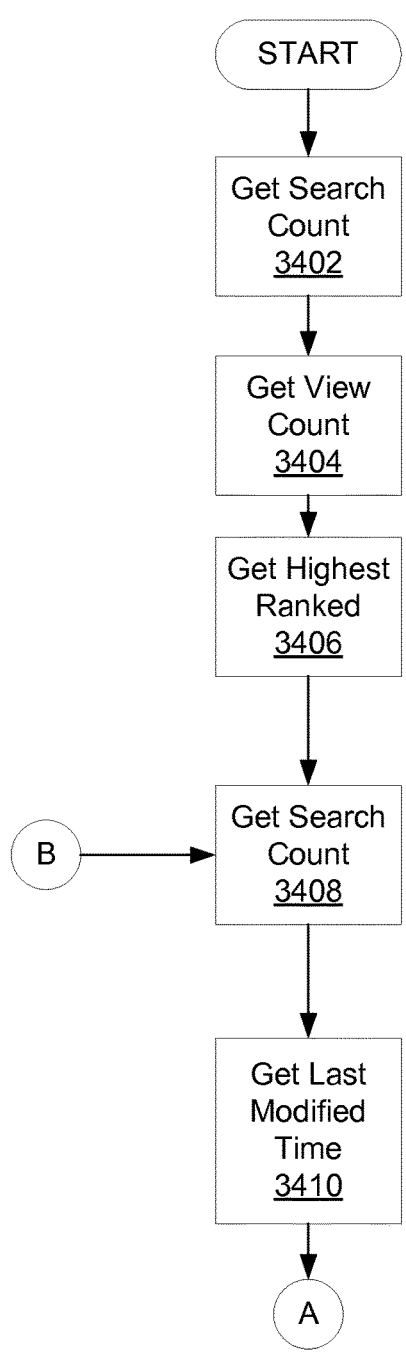
FIGS. 34A and 34B are simplified diagrams illustrating a process flow of ranking an event in the audit database according to some embodiments.
Figure 34B:
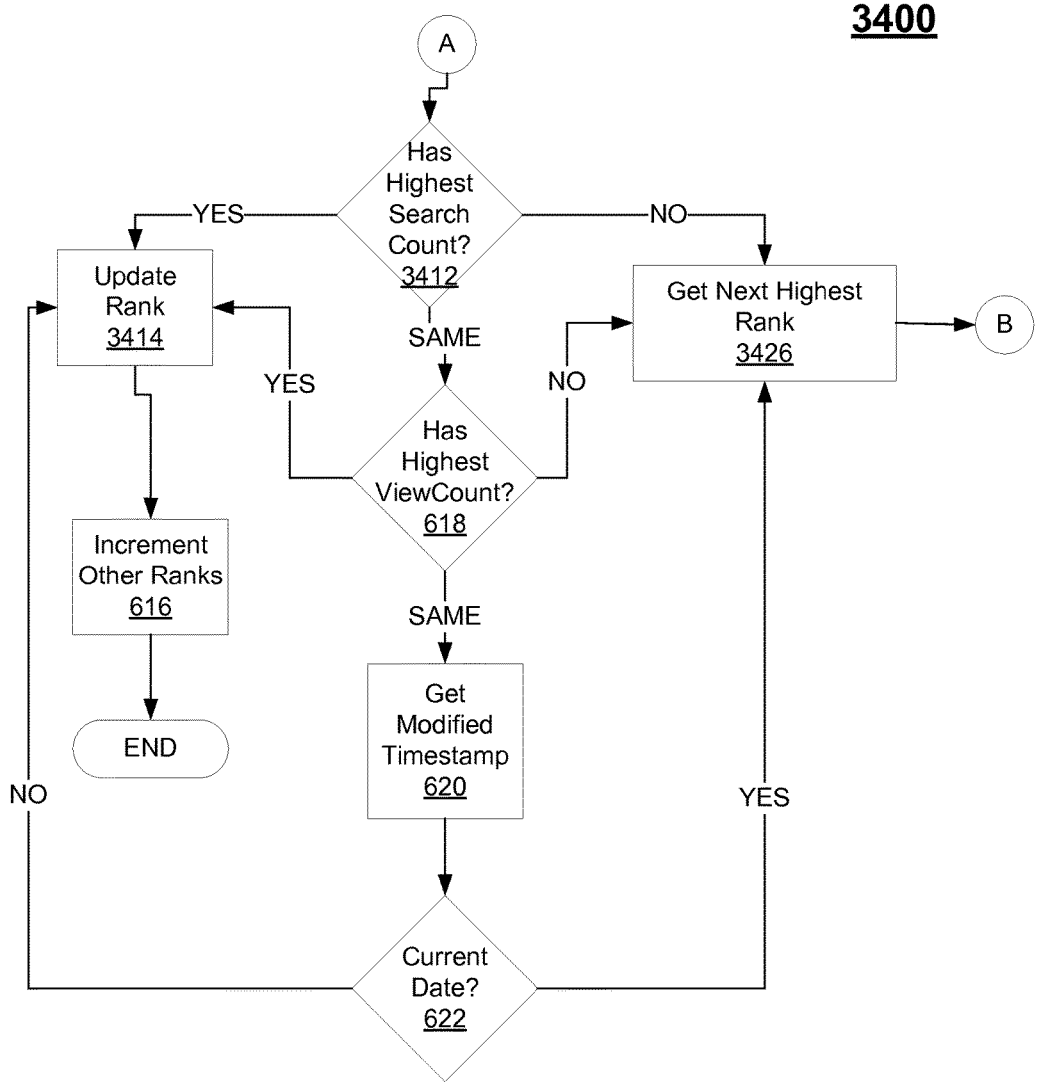

FIGS. 34A and 34B are simplified diagrams illustrating a process flow 3400 of ranking an event in the audit database according to some embodiments.

Recommendation service 226 calculates a rank for a record that was created or updated in response to the creation of a new recommendation.

At 3402, recommendation service 226 retrieves the count of search events from recommendation detail table 514. At 3404, recommendation service 226 retrieves the count of view events from recommendation detail table 514. Recommendation service 226 retrieves, at 3406, the record with highest rank in the same group, retrieves, at 3408, the search count, and retrieves, at 3410, the last modified time of the record. At 3412, recommendation service 226 determines which record has the highest count by comparing the number of search events and view events against the number of search and view events of the newly created or updated record.

If, at 3412, both the view and search count of newly created or updated document is greater than the retrieved record, recommendation service 226 updates, at 3414, the rank of the newly created or updated document as the highest rank, and increments, at 3416, the ranks of the other records (in this example, by one).

Otherwise, if, at 3412, if the newly created or updated record has view events more and, and at 3418, search events less than the existing record with highest rank, recommendation service 226 retrieves the last modified time stamp, at 3418, and determines, at 3420, whether the last modified time stamp is current.

If, at 3420, the timestamp is dated as current date, then the existing document continues to have the highest RANK. Otherwise, at 3420, the timestamp is not current, the new document gets, at 3414, the highest RANK since the searches that exist are old (in this example, a day old) and the new document has the highest view counts which makes it more eligible for the highest rank.

If, at 3412 and 3418, the newly created or updated record has view events less and search events more than the existing record with highest rank, respectively, recommendation service 226 checks, at 3420, for the last modified timestamp of the SEARCH event of the new record. If, at 3422, the timestamp is dated as current date then the new document gets the highest RANK else the existing document continues with the highest RANK since SEARCH event is given higher weightage than VIEW event.

If both existing record and new record has same number of search records and view records than engine compares the modified timestamp. The one with latest timestamp gets the highest RANK in this case. If there are no search records existing for both the documents, then RANK is calculated based on just the VIEW count and the modified timestamp only. The record with highest count gets the precedence.

If more than one record happens to have the same count, then the weight is given, at 0622, to the record with latest modified timestamp.

If the new record does not qualify for the highest RANK, recommendation service 226 does the same set of comparison with the records with the subsequent RANK at 3426, until recommendation service 226 finds its position. Anytime the new or updated record gets assigned with a RANK all the records with RANK equal to greater than that RANK will have their RANK incremented by 1 at 3416.

Process 3400 may be used for events that are new, view, and search. In some embodiments, schedule events do not trigger the count. Recommendation service 226 updates the timestamp of the existing NEW or VIEW parent record. In short, SEARCH events are given higher precedence, followed by VIEW event, and then NEW events. Schedule events increment the timestamp of the parent record and its existence is used to suggest the weight of the most recently viewed items.

If multiple records have same count, the records with latest timestamp is given preference.

FIG. 35 is a diagram illustrating a recommendation header table 512 for ranking according to some embodiments. FIG. 36 is a diagram illustrating a recommendation detail table 514 for ranking according to some embodiments. Recommendation header table 512 of FIG. 35 and recommendation detail table 514 of FIG. 36 reflect the ranking of documents in the group.

FIG. 37 is a diagram illustrating a summary table 3700 of results of the ranking of FIGS. 34A and 34B. Per the summary table 3700, document with ID "D_ID_5," which has the highest search count (3) and view count (5), received the RANK 1, followed by document with ID (D_ID_3), which has the next highest search (3) and view count (4, document with ID (D_ID_4) received the next RANK even though document (D_ID_1) has a higher view count because of the higher SEARCH count of document (D_ID_4). Comparing documents with IDS (D_ID_5), ID (D_ID_6), and ID (D_ID_7), they have same search and view count, but the one with latest timestamp got a higher RANK compared to the others.

With this data, when a user logs in, recommendation service 226 returns the top records (in this example, 5) with starting with RANK 1. The record with RANK 1 will be shown first followed by other records. When user selects a hyperlink "more," recommendation service 226 provides the next records (in this example, 15) in the order of RANK. All the records retuned belong to the same group as the group to which user who is logging in will belong to.

As described above, a business intelligence enterprise system may generate integrated recommendations using search history of multiple users to determine a rank of the recommendations. Search keywords are indicative of the interests of the users.

Further, a business intelligence enterprise system may generate recommendations to users based on the usage of documents by other users with similar roles.

The system may separate the most recently viewed documents and the recommended documents so that the user knows that recommended documents are not the documents which the user has recently seen. This allows collaboration between users within the same group without actually sharing the documents among the users.

The system can provide recommendations out the system. The recommendations may be provided as RESTFUL web services that are available for any client or partners for consumption.

By using the audit events as a triggering point, the system is unlikely to miss an event because the audit events should be done for every document transaction and can be clearly defined.

By generating recommendations based on groups, the system provides recommendations only if the user has access rights on the document. This provides the security of the recommendations, and it is embedded within the recommendation engine using the same set of groups and roles as defined by the security of business intelligence system.

Figure 38:
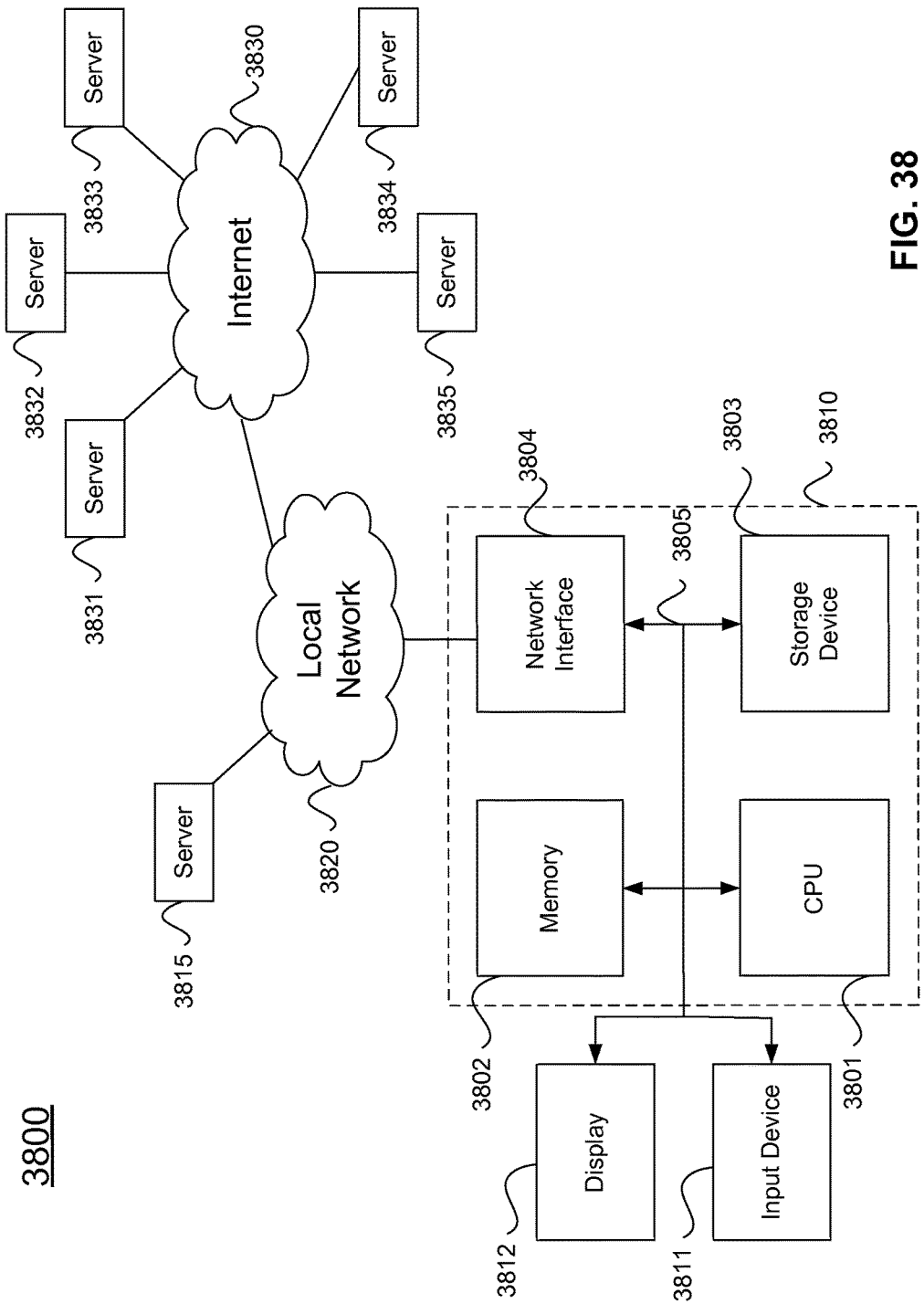
FIG. 38 is a block diagram illustrating an example of a computer system for the enterprise systems of FIGS. 1 and 2.

An example system 3800 for enterprise system 100 and enterprise system 200 is illustrated in FIG. 38. Computer system 3810 includes a bus 3805 or other communication mechanism for communicating information, and a processor 3801 coupled with bus 3805 for processing information. Computer system 3810 also includes a memory 3802 coupled to bus 3805 for storing information and instructions to be executed by processor 3801, including information and instructions for performing the techniques described above, for example. This memory may also be used for storing variables or other intermediate information during execution of instructions to be executed by processor 3801. Possible implementations of this memory may be, but are not limited to, random access memory (RAM), read only memory (ROM), or both. A storage device 3803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 3803 may include source code, binary code, or software files for performing the techniques above, for example. Storage device and memory are both examples of computer readable mediums.

Computer system 3810 may be coupled via bus 3805 to a display 3812, such as a cathode ray tube (CRT) or liquid crystal display (LCD), for displaying information to a computer user. An input device 3811 such as a keyboard and/or mouse is coupled to bus 3805 for communicating information and command selections from the user to processor 3801. The combination of these components allows the user to communicate with the system, such as with enterprise system 100. In some systems, bus 3805 may be divided into multiple specialized buses.

Computer system 3810 also includes a network interface 3804 coupled with bus 3805. Network interface 3804 may provide two-way data communication between computer system 3810 and the local network 3820. The network interface 3804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 3804 sends and receives electrical, electromagnetic, or optical signals that carry digital data streams representing various types of information.

Computer system 3810 can send and receive information, including messages or other interface actions, through the network interface 3804 across a local network 3820, an Intranet, or the Internet 3830. For a local network, computer system (1010 may communicate with a plurality of other computer machines, such as server 3815. Accordingly, computer system 3810 and server computer systems represented by server 3815 may form a cloud computing network, which may be programmed with processes described herein. In the Internet example, software components or services may reside on multiple different computer systems 3810 or servers 3831-1035 across the network. The processes described above may be implemented on one or more servers, for example. A server 3831 may transmit actions or messages from one component, through Internet 3830, local network 3820, and network interface 3804 to a component on computer system 3810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method for recommending documents to a user, the method comprising:
    determining, by a computer, audit logs entries that are associated with members of a group that includes the user as a member, each audit log entry is associated with a file stored in a database that a member of the group has accessed during a create event, during a view event, or during a search event, the database further comprising a recommendation table including a timestamp field, an event field, and a rank field;
    analyzing, by the computer, the associated audit log entries;
    analyzing, by the computer, a scheduled time of refreshing of data from the database, the analyzing comprising referencing a value of the event field of the recommendation table, the file comprising a report previously accessed by the members of the group; and
    generating, by the computer, a recommendation of the file for the user in an order according to a rank based on the analyzing of the associated audit log entries, a count of the value, and the scheduled time updating the timestamp field,
    wherein the value of the search event is greater than the value of the view event, and the value of the view event is greater than the value of the create event, and
    wherein the timestamp field is used to determine preference in rank between recommendations having a same count after consideration of the view event.

2. The computer-implemented method of claim 1 wherein the audit log entries include search information of the members of the group.

3. The computer-implemented method of claim 2 wherein generating, by the computer, the recommendation further includes generating the recommendation to the user of the group based on search information of other members of the group.

4. The computer-implemented method of claim 1 wherein analyzing, by the computer, the associated audit log entries further includes determining files having a highest number of views by members of the group.

5. The computer-implemented method of claim 1 wherein analyzing, by the computer, the associated audit log entries further includes determining times that files are viewed by members of the group,
    wherein generating, by the computer, the recommendation includes generating the recommendation based on a number of times that files are viewed by members of the group.

6. The computer-implemented method of claim 1 wherein analyzing, by the computer, the associated audit log entries includes determining times that files are used by the user,
    wherein generating, by the computer, the recommendation further includes generating the recommendation based on a number of times that files are used by the user.

7. The computer-implemented method of claim 1 wherein analyzing, by the computer, the associated audit log entries includes determining a date of creation of files by members of the group,
    wherein generating, by the computer, the recommendation further includes generating the recommendation based on the date of creation by members of the group.

8. A non-transitory computer readable storage medium embodying a computer program for performing a method, the method comprising:
    determining, by a computer, audit logs entries that are associated with members of a group that includes the user as a member, each audit log entry is associated with a file stored in a database that a member of the group has accessed during a create event, during a view event, or during a search event, the database further comprising a recommendation table including a timestamp field, an event field, and a rank field;
    analyzing, by the computer, the associated audit log entries;
    analyzing, by the computer, a scheduled time of refreshing of data from the database, the analyzing comprising referencing a value of the event field of the recommendation table, the file comprising a report previously accessed by the members of the group; and
    generating, by the computer, a recommendation of the file for the user in an order according to rank based on the analyzing of the associated audit log entries, a count of the value, and the scheduled time updating the timestamp field,
    wherein the value of the search event is greater than the value of the view event, and the value of the view event is greater than the value of the create event, and wherein the timestamp field is used to determine a preference in rank between recommendations having a same count after consideration of the view event.

9. The non-transitory computer readable storage medium of claim 8 wherein the audit log entries include search information of the members of the group.

10. The non-transitory computer readable storage medium of claim 9 wherein generating, by the computer, the recommendation further includes generating the recommendation to the user of the group based on search information of other members of the group.

11. The non-transitory computer readable storage medium of claim 8 wherein analyzing, by the computer, the associated audit log entries includes determining files having a highest number of views by members of the group.

12. The non-transitory computer readable storage medium of claim 8 wherein analyzing, by the computer, the associated audit log entries includes determining times that files are viewed by members of the group,
wherein generating, by the computer, the recommendation further includes generating the recommendation based on a number of times that files are viewed by members of the group.

13. The non-transitory computer readable storage medium of claim 8 wherein analyzing, by the computer, the associated audit log entries includes determining times that files are used by the user,
wherein generating, by the computer, the recommendation further includes generating the recommendation based on a number of times that files are used by the user.

14. A computer system comprising:
one or more processors;
a software program, executable on the computer system, the software program configured to:
determine audit logs entries that are associated with members of a group that includes the user as a member, each audit log entry is associated with a file stored in a database that a member of the group has accessed during a create event, during a view event, or during a search event, the database further comprising a recommendation table including a timestamp field, an event field, and a rank field;
analyze the associated audit log entries;
analyze a scheduled time of refreshing of data from the database, the file comprising a report previously accessed by the members of the group the analyzing comprising referencing a value of the event field of the recommendation table; and
generate a recommendation of the file for the user in an order according to a rank based on the analyzing of the associated audit log entries, a count of the value, and the scheduled time updating the timestamp field,
wherein the value of the search event is greater than the value of the view event, and the value of the view event is greater than the value of the create event, and
wherein the timestamp field is used to determine a preference in rank between recommendations having a same count after consideration of the view event.

15. The computer system of claim 14 wherein the audit log entries include search information of the members of the group.

16. The computer system of claim 15 wherein the software program is further configured to generate the recommendation to the user of the group based on search information of other members of the group.

17. The computer system of claim 14 wherein the software program is configured to analyze the associated audit log entries by determining files having a highest number of views by members of the group.

18. The computer system of claim 14 wherein the software program is configured to analyze the associated audit log entries by determining times that files are viewed by members of the group,
wherein the software program is configured to further generate the recommendation by generating the recommendation based on a number of times that files are viewed by members of the group.

19. The computer system of claim 14 wherein the software program is configured to analyze the associated audit log entries by determining times that files are used by the user,
wherein the software program is configured to further generate the recommendation by generating the recommendation based on a number of times that files are used by the user.

20. The computer system of claim 14 wherein the software program is configured to analyze the associated audit log entries by determining a date of creation of files by members of the group,
wherein the software program is configured to further generate the recommendation by generating the recommendation based on the date of creation by members of the group.

* * * * *